US012542113B2

(12) United States Patent
Yang et al.

(10) Patent No.: US 12,542,113 B2
(45) Date of Patent: Feb. 3, 2026

(54) DISPLAY APPARATUS, DRIVING METHOD, AND ELECTRONIC DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Tao Yang, Beijing (CN); Dongchuan Chen, Beijing (CN); Yanping Liao, Beijing (CN); Yue Yang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 65 days.

(21) Appl. No.: 18/580,041

(22) PCT Filed: May 31, 2022

(86) PCT No.: PCT/CN2022/096381
§ 371 (c)(1),
(2) Date: Jan. 17, 2024

(87) PCT Pub. No.: WO2023/230887
PCT Pub. Date: Dec. 7, 2023

(65) Prior Publication Data
US 2024/0347017 A1 Oct. 17, 2024

(51) Int. Cl.
*G09G 3/20* (2006.01)
*G09G 3/36* (2006.01)

(52) U.S. Cl.
CPC ......... *G09G 3/3677* (2013.01); *G09G 3/3607* (2013.01); *G09G 2310/08* (2013.01)

(58) Field of Classification Search
CPC .......... G09G 3/3677; G09G 3/20; G09G 3/36; G09G 3/3607; G09G 2310/08
See application file for complete search history.

(56) References Cited

U.S. PATENT DOCUMENTS 10,438,522 B2 * 10/2019 Hur ...................... G09G 3/3614
10,573,220 B2 2/2020 Xiang et al.
(Continued)

FOREIGN PATENT DOCUMENTS

CN 102968971 A 3/2013
CN 104297934 A 1/2015
(Continued)

*Primary Examiner* — Olga V Merkoulova
(74) *Attorney, Agent, or Firm* — LEASON ELLIS LLP

(57) ABSTRACT

A display apparatus, a driving method, and an electronic device. The display apparatus includes a display substrate, a control unit, a gate driving unit, and a data driving unit. The display substrate includes rows and columns of sub-pixels, gate scanning signal lines, and data signal lines. The control unit is configured to trigger an image conversion operation for converting an image frame to be displayed into at least one target image frame corresponding to a preset type and a clock conversion operation for obtaining at least one group of clock signals. The gate driving unit is configured to output a gate scanning signal to some of the gate scanning signal lines, and the data driving unit is configured to output a data signal to the data signal lines on the basis of pixel data of each target image frame.

19 Claims, 23 Drawing Sheets

(56) References Cited

U.S. PATENT DOCUMENTS

| | | | | |
|---|---|---|---|---|
| 11,282,470 | B2 | 3/2022 | Fu et al. | |
| 11,636,793 | B2 * | 4/2023 | Sun | G09G 3/2092 345/204 |
| 2010/0157189 | A1 * | 6/2010 | Ma | G02F 1/136286 349/48 |
| 2015/0103068 | A1 * | 4/2015 | Kim | G09G 3/296 345/99 |
| 2017/0146839 | A1 * | 5/2017 | Li | G02F 1/134336 |
| 2019/0051243 | A1 * | 2/2019 | Li | G09G 3/2003 |
| 2020/0035178 | A1 * | 1/2020 | Wang | G09G 3/3266 |
| 2020/0251072 | A1 | 8/2020 | Chen et al. | |
| 2020/0312225 | A1 * | 10/2020 | Hussell | H10H 20/8506 |
| 2022/0301489 | A1 * | 9/2022 | Wang | G09G 3/32 |

FOREIGN PATENT DOCUMENTS

| | | | |
|---|---|---|---|
| CN | 104183223 | B | 1/2018 |
| CN | 107633834 | A | 1/2018 |
| CN | 108922470 | A | 11/2018 |
| CN | 109920390 | A | 6/2019 |
| CN | 110517623 | A | 11/2019 |
| CN | 107506161 | B | 5/2020 |
| CN | 111508409 | A | 8/2020 |

* cited by examiner

DISPLAY APPARATUS, DRIVING METHOD, AND ELECTRONIC DEVICE

CROSS-REFERENCE TO RELATED PATENT APPLICATIONS

This application is a U.S. National Stage Application under 35 U.S.C. § 371 of International Patent Application No. PCT/CN2022/096381 filed May 31, 2022, which is incorporated by reference in its entirety.

TECHNICAL FIELD

Embodiments of the present disclosure relate to a display apparatus, a drive method, and an electronic device.

BACKGROUND

With the development of display technology, display apparatuses are widely used, while requirements for display resolution are increasing. For example, with the gradual popularization of 4K technology, display apparatuses with 8K resolution are introduced, 8K technology makes the details of display screens clear and brings better viewing. As the display resolution increases, the number of pixels increases, the amount of data transferred for displaying increases correspondingly, and the data transfer rate of data driver chips increases accordingly.

SUMMARY

At least one embodiment of the present disclosure provides a display apparatus, and the display apparatus includes: a display substrate, a control unit, a gate drive unit and a data drive unit, the display substrate includes multiple rows of sub-pixels and multiple columns of sub-pixels arranged in an array, multiple gate scanning signal lines respectively connected to the multiple rows of sub-pixels, and multiple data signal lines respectively connected to the multiple columns of sub-pixels; the control unit is configured to trigger an image conversion operation and a clock conversion operation depending on a to-be-displayed image frame being an image of a preset type, the image conversion operation is used for converting the to-be-displayed image frame into at least one target image frame corresponding to the preset type by controlling a data signal, and the clock conversion operation is used for converting multiple initial clock signals into at least one set of clock signals corresponding to the at least one target image frame by controlling a clock signal; the gate drive unit is configured to sequentially shift to output gate scanning signals to a part of the multiple gate scanning signal lines on the basis of the set of clock signals corresponding to the target image frame, for each of the at least one target image frame; and the data drive unit is configured to output corresponding data signals to the multiple data signal lines on the basis of pixel data of the target image frame, for each of the target image frames; in which voltage variation of the data signals is less than a first threshold value when the gate drive unit sequentially shifts to output the gate scanning signals to the part of the gate scanning signal lines, for each of the target image frames.

For example, in the display apparatus provided by at least one embodiment of the present disclosure, voltage of the data signals is maintained constant when the gate drive unit sequentially shifts to output the gate scanning signals to the part of the gate scanning signal lines, for each of the target image frames.

For example, in the display apparatus provided by at least one embodiment of the present disclosure, each of the at least one set of clock signals is some of the multiple initial clock signals; and the at least one target image frame is consecutive image frames.

For example, in the display apparatus provided by at least one embodiment of the present disclosure, the multiple rows of sub-pixels and the multiple columns of sub-pixels comprise various types of sub-pixels, and the various types of sub-pixels output light in multiple colors; and in each of the target image frames, a difference value in grayscales corresponding to the same type of sub-pixels is not greater than a second threshold.

For example, in the display apparatus provided by at least one embodiment of the present disclosure, each row of the multiple rows of sub-pixels and the multiple columns of sub-pixels comprises multiple sub-pixels, the multiple sub-pixels comprise a first type of sub-pixels, a second type of sub-pixels and a third type of sub-pixels arranged circularly; the multiple sub-pixels in each row are connected to two of the multiple gate scanning signal lines, and the two gate scanning signal lines are connected to an odd-numbered column of sub-pixels and an even-numbered column of sub-pixels of the multiple sub-pixels, respectively; and each of the multiple data signal lines connects two columns of sub-pixels of the same type.

For example, in the display apparatus provided by at least one embodiment of the present disclosure, the two gate scanning signal lines comprise a first gate scanning signal line connected to one of an even-numbered column of sub-pixels and an odd-numbered column of sub-pixels in the corresponding row and a second gate scanning signal line connected to the other of them.

For example, in the display apparatus provided by at least one embodiment of the present disclosure, the preset type comprises a first type, in which pixel data of an ith row of pixels and pixel data of an (i+1)th row of pixels of an image of the first type correspond to a first grayscale range and a second grayscale range, respectively, and the first grayscale range being larger than the second grayscale range, where i is a positive integer.

For example, in the display apparatus provided by at least one embodiment of the present disclosure, in a case where the to-be-displayed image frame is the first type, the at least one target image frame comprises a first image frame, and the pixel data of the ith row of pixels and the pixel data of the (i+1)th row of pixels of the first image frame both correspond to the first grayscale range; in a case that the target image frame is the first image frame, the part of the gate scanning signal lines comprise the gate scanning signal line connected to sub-pixels of the ith row of pixels.

For example, in the display apparatus provided by at least one embodiment of the present disclosure, the preset type comprises a second type, pixel data of an odd-numbered column of pixels and pixel data of an even-numbered column of pixels of an image of the second type correspond to a third grayscale range and a fourth grayscale range, respectively, and the third grayscale range is different from the fourth grayscale range.

For example, in the display apparatus provided by at least one embodiment of the present disclosure, in a case that the to-be-displayed image frame is the second type, the at least one target image frame comprises a second image frame and a third image frame that are consecutive; pixel data of the first type of sub-pixels and pixel data of the third type of sub-pixels in the second image frame correspond to a larger one of the third grayscale range and the fourth grayscale range, and pixel data of the second type of sub-pixels in the second image frame corresponds to the one with a smaller brightness of the third grayscale range and the fourth grayscale range; and pixel data of the second type of sub-pixels in the third image frame corresponds to the one with a greater brightness of the third grayscale range and the fourth grayscale range, and pixel data of the first type of sub-pixels and pixel data of the third type of sub-pixels in the third image frame correspond the one with the smaller brightness of the third grayscale range and the fourth grayscale range.

For example, in the display apparatus provided by at least one embodiment of the present disclosure, in a case where the target image frame is the second image frame, the part of the gate scanning signal lines comprise a first part of gate scanning signal lines; and in a case where the target image frame is the third image frame, the part of the gate scanning signal lines comprise a second part of gate scanning signal lines; the first part of gate scanning signal lines comprise multiple first gate scanning signal lines respectively connected to the multiple rows of sub-pixels, and the second part of gate scanning signal lines comprise multiple second gate scanning signal lines respectively connected to the multiple rows of sub-pixels.

For example, in the display apparatus provided by at least one embodiment of the present disclosure, the preset type comprises a third type, pixel data of a first part of pixels and pixel data of a second part of pixels of an image of the third type correspond to a fifth grayscale range and a sixth grayscale range, respectively, the first part of pixels and the second part of pixels are alternately arranged in a row direction as well as in a column direction, and the fifth grayscale range is different from the sixth grayscale range.

For example, in the display apparatus provided by at least one embodiment of the present disclosure, in a case where the to-be-displayed image frame is the third type, the at least one target image frame comprises a fourth image frame and a fifth image frame that are consecutive; pixel data of the first type of sub-pixels and pixel data of the third type of sub-pixels in the fourth image frame correspond to the one with a greater brightness of the fifth grayscale range and the sixth grayscale range, pixel data of the second type of sub-pixels in the fourth image frame corresponds to the one with a smaller brightness of the fifth grayscale range and the sixth grayscale range; and pixel data of the second type of sub-pixels in the fifth image frame corresponds to the one with a greater brightness of the fifth grayscale range and the sixth grayscale range, and pixel data of the first type of sub-pixels and pixel data of the third type of sub-pixels in the fifth image frame correspond to the one with a smaller brightness of the fifth grayscale range and the sixth grayscale range.

For example, in the display apparatus provided by at least one embodiment of the present disclosure, in a case that the target image frame is the fourth image frame, the part of gate scanning signal lines comprise a third part of gate scanning signal lines; and in a case that the target image frame is the fifth image frame, the part of gate scanning signal lines comprise a fourth part of gate scanning signal lines; the third part of gate scanning signal lines comprise multiple first gate scanning signal lines connected to multiple odd-numbered rows of sub-pixels and multiple second gate scanning signal lines connected to multiple even-numbered rows of sub-pixels, respectively, and the fourth part of gate scanning signal lines comprise multiple first gate scanning signal lines connected to multiple even-numbered rows of sub-pixels and multiple second gate scanning signal lines connected to multiple odd-numbered rows of sub-pixels, respectively.

For example, in the display apparatus provided by at least one embodiment of the present disclosure, the control unit comprises a timing controller and a level shifter; the timing controller is configured to receive the pixel data of the to-be-displayed image frame, and to generate the multiple initial clock signals on the basis of the pixel data of the to-be-displayed image frame, depending on the to-be-displayed image frame being an image of the preset type; and the level shifter is configured to receive the initial clock signals from the timing controller, and perform, in response to receiving the initial clock signals, the clock conversion operation.

For example, in the display apparatus provided by at least one embodiment of the present disclosure, the timing controller is configured to sequentially transfer the pixel data corresponding to the at least one target image frame to the data drive unit depending on the to-be-displayed image frame being an image of a preset type; or the timing controller is configured to send an image conversion execution instruction to the data drive unit to trigger the data drive unit to transmit a corresponding data signal to perform the image conversion operation depending on the to-be-displayed image frame being an image of a preset type.

For example, in the display apparatus provided by at least one embodiment of the present disclosure, the gate drive unit comprises multiple cascaded shift registers, and each of the shift registers comprises: a first circuit connected to an input signal end, a first node and a second node of the shift register, the first circuit being configured to provide a signal from the input signal end to the first node and to pull down a potential of the first node under the control of a potential of the second node; a control circuit connected to the first node and the second node, the control circuit being configured to control the potential of the second node according to the potential of the first node; a cascade circuit connected to the first node, the second node, and a cascade output end and a control clock signal end of the shift register, the cascade circuit being configured to provide a signal from the control clock signal end to the cascade output end under the control of the potential of the first node, and to pull down a potential of the cascade output end under the control of the potential of the second node; K output circuits connected to the input signal end, the second node, and K output clock signal ends, K sub-nodes, and K output signal ends of the shift register, respectively, in which a kth output circuit is connected to the input signal end, the second node, a kth output signal end, and a kth sub-node, and is configured to input a signal from the input signal end to the kth sub-node, provide a signal from the kth output clock signal end to the kth output signal end under the control of a potential of the kth sub-node, and pull down a potential of the kth output signal end under the control of the potential of the second node, where K is an integer greater than 1, k is an integer, and $1 \le k \le K$.

For example, in the display apparatus provided by at least one embodiment of the present disclosure, the kth output circuit comprises: an input sub-circuit connected to the input signal end and the kth sub-node and configured to provide a signal from the input signal end to the kth sub-node; an output sub-circuit connected to the kth sub-node, the kth output clock signal end, and the kth output signal end and configured to provide a signal from the kth output clock signal end to the kth output signal end under the control of the potential of the kth sub-node; and a second sub-circuit connected to the second node and configured to pull down the potential of the kth sub-node and the kth output signal end under the control of the potential of the second node.

At least one embodiment of the present disclosure further provides a drive method of the display apparatus according to any one of the embodiments mentioned above, which includes: converting a to-be-displayed image frame into at least one target image frame by controlling a data signal depending on the to-be-displayed image frame being an image of a preset type, and obtaining at least one set of clock signals corresponding to the at least one target image frame, respectively, by controlling a clock signal; by the gate drive unit, sequentially shifting to output gate scanning signals to a part of the multiple gate scanning signal lines on the basis of the set of clock signals corresponding to the target image frame, for each of the at least one target image frame; and by the data drive unit, outputting corresponding data signals to the multiple data signal lines on the basis of pixel data corresponding of the target image frame, for each of the target image frames; in which voltage variation of the data signals is less than a first threshold value when the gate drive unit sequentially shifts to output the gate scanning signals to the part of the gate scanning signal lines, for each of the target image frames.

At least one embodiment of the present disclosure further provides an electronic device, which includes the display apparatus according to any one of the embodiments mentioned above.

BRIEF DESCRIPTION OF DRAWINGS

In order to illustrate the technical solutions of the embodiments of the present disclosure clearer, the drawings of the embodiments will be briefly described. Obviously, the drawings in the following only relate to some embodiments of the present disclosure, and are not intended to limit the present disclosure.

DETAILED DESCRIPTION

Figure 1:
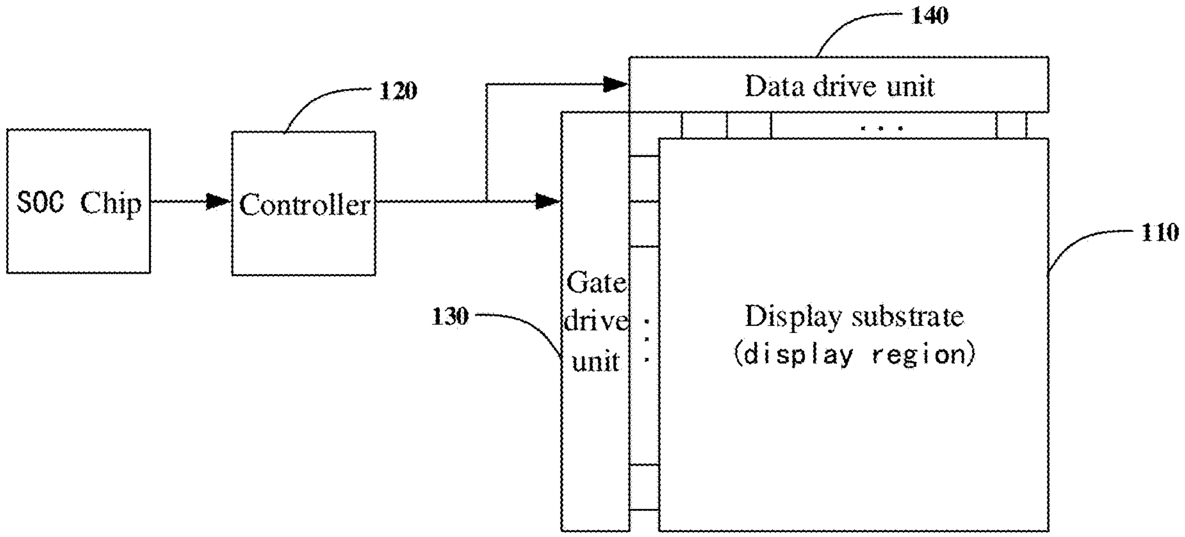
FIG. 1 is a schematic diagram of a display apparatus according to at least one embodiment of the present disclosure.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for invention, are not intended to indicate any sequence, amount or importance, but distinguish various components. Similarly, the terms "one" or "the" do not indicate a quantity limit, but rather indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

For large-resolution display apparatuses, the number of pixels is increased. For example, a display apparatus with 8K resolution has the amount of data four times greater than that of a display apparatus with 4K resolution, and the transfer rate of a data driver chip is increased correspondingly. Especially for some display apparatuses, the number of data driver chips is reduced (e.g. by half) and the transfer rate of a single data driver chip is further increased (e.g. doubled). An increase in the transfer rate of the chip results in a corresponding rise in power consumption, increased heat generation and higher temperature. In the process of outputting a reload screen, data voltage of the data driver chip has a rapid jump, resulting in high power consumption of the chip, and the chip temperature may be close to the limit of normal operating temperature of the chip, resulting in a high risk of burnout. Moreover, with the fast data transfer rate of the chip and the short time length of each data, the impact of the difference in transfer delay caused by the difference in resistance of data lines on a panel becomes more obvious, which is prone to causing the problem of vertical stripes in display.

At least one embodiment of the present disclosure provides a display apparatus including a display substrate, a control unit, a gate drive unit, and a data drive unit; the display substrate includes multiple rows of sub-pixels and multiple columns of sub-pixels arranged in an array, multiple gate scanning signal lines respectively connected to the multiple rows of sub-pixels, and multiple data signal lines respectively connected to the multiple columns of sub-pixels; the control unit is configured to trigger an image conversion operation and a clock conversion operation depending on a to-be-displayed image frame being an image of a preset type, in which the image conversion operation is used for converting the to-be-displayed image frame into at least one target image frame corresponding to the preset type by controlling a data signal, and the clock conversion operation is used for converting multiple initial clock signals into at least one set of clock signals corresponding to the at least one target image frame by controlling a clock signal; the gate drive unit is configured to sequentially shift to output gate scanning signals to a part of the multiple gate scanning signal lines on the basis of the set of clock signals corresponding to the target image frame, for each of the at least one target image frame; and the data drive unit is configured to output corresponding data signals to the multiple data signal lines on the basis of pixel data of the target image frame, for each of the target image frames; in which voltage variation of the data signal is less than a first threshold value when the gate drive unit sequentially shifts to output the gate scanning signals to the part of the gate scanning signal lines, for each of the target image frames.

At least one embodiment of the present disclosure further provides a corresponding drive method for the display apparatus and an electronic device including the display apparatus.

According to the display apparatus provided by the embodiments of the present disclosure, jump cycle of the data signal is extended to a greater extent, and the rapid jump of data voltage on the data driver chip is avoided, thereby lowering power consumption of the driver chip and reducing temperature. Moreover, since the rapid jump of the voltage on the data driver chip is avoided, the impact of the difference in resistance on the data lines is weakened, and the problem of vertical stripes on the reload screen can be solved.

Embodiments of the present disclosure and some examples thereof are described in detail below with reference to the accompanying drawings.

FIG. 1 is a schematic diagram of a display apparatus according to at least one embodiment of the present disclosure. As shown in FIG. 1, the display apparatus includes a display substrate 110, a control unit 120, a gate drive unit 130, and a data drive unit 140.

Figure 2:
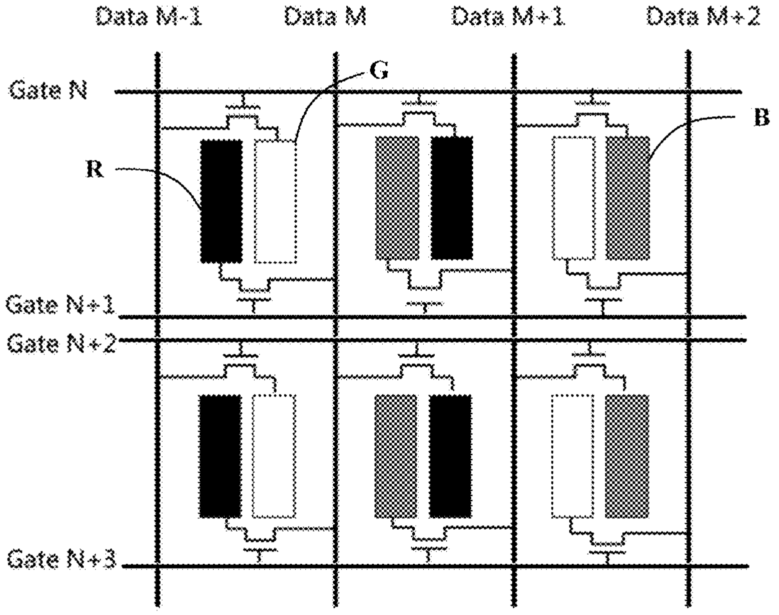
FIG. 2 is a schematic diagram of a display substrate according to at least one embodiment of the present disclosure.

FIG. 2 is a schematic diagram of a display substrate according to at least one embodiment of the present disclosure. As shown in FIG. 2, a pixel region of the display substrate includes multiple rows of sub-pixels R, G and B and multiple columns of sub-pixels R, G and B arranged in an array, multiple gate scanning signal lines Gate respectively connected to the multiple rows of sub-pixels, and multiple data signal lines Data respectively connected to the multiple columns of sub-pixels. For example, the multiple gate scanning signal lines Gate all extend in a first direction, and the multiple data signal lines Data all extend in a second direction, where the first direction crosses the second direction, e.g., the first direction is perpendicular to the second direction. The multiple gate scanning signal lines Gate are each connected to multiple rows of sub-pixels to respectively provide gate scanning signals for the multiple rows of sub-pixels, and the number of gate scanning signal lines and the number of rows of sub-pixels may be the same or different. The multiple data signal lines Data are connected to the multiple columns of sub-pixels respectively to provide data signals for the multiple columns of sub-pixels respectively, and the number of the data signal lines and the number of columns of sub-pixels may be the same or different.

For example, each of the sub-pixels may include a light emitting element and a pixel circuit, the pixel circuit may include multiple transistors and at least one storage capacitor, the storage capacitor may include a liquid crystal storage capacitor that drives the rotation of liquid crystal, and the multiple transistors may include, for example, a driving transistor, a data writing transistor, and a light emitting control transistor. The gate scanning signal lines and the data signal lines may be connected to the pixel circuits. The pixel circuit of each of the sub-pixels may be connected to at least one gate scanning signal line and at least one data signal line. For example, the gate scanning signal line may be connected to a gate electrode of a transistor to drive the transistor on or off. The data signal line may be connected to a source electrode or a drain electrode of a data writing transistor to input a data signal into the pixel circuit via the data writing transistor, so that the pixel circuit controls the brightness of a corresponding light-emitting clement according to the data signal, the brightness of each of the sub-pixels being related to the data signal written to the sub-pixel.

For example, the multiple rows of sub-pixels and the multiple columns of sub-pixels include various types of sub-pixels, and the various types of sub-pixels output light in multiple colors. For example, each row of the multiple rows of sub-pixels and multiple columns of sub-pixels includes multiple sub-pixels, the multiple sub-pixels include a first type of sub-pixels, a second type of sub-pixels and a third type of sub-pixels arranged circularly.

For example, in some embodiments, the first type of sub-pixels, the second type of sub-pixels, and the third type of sub-pixels may be one of a red sub-pixel (Red, R for short), a green sub-pixel (Green, G for short), and a blue sub-pixel (Blue, B for short), respectively. Optionally, a white sub-pixel or a sub-pixel in another color may also be included, which is not limited thereto. The red sub-pixel is used to emit red light, the green sub-pixel is used to emit green light, and the blue sub-pixel is used to emit blue light. As shown in FIG. 2, the embodiment of the present disclosure is exemplified by the first type of sub-pixels being a red sub-pixel R (indicated by a black-filled box in FIG. 2), the second type of sub-pixels being a green sub-pixel G (indicated by a white-filled box in FIG. 2), and the third type of sub-pixels being a blue sub-pixel B (indicated by a gray-filled box in FIG. 2), but the present disclosure is not limited thereto. For example, in some other embodiments, the first type of sub-pixels may be a blue sub-pixel B, the second type of sub-pixels may be a green sub-pixel G, and the third type of sub-pixels may be a red sub-pixel R. Alternatively, the first type of sub-pixels may be a green sub-pixel G, the second type of sub-pixels may be a red sub-pixel R, the third type of sub-pixels may be a red sub-pixel R, and so on.

For example, the multiple rows of sub-pixels and the multiple columns of sub-pixels may include other types of sub-pixels, such as a white sub-pixel, in addition to at least one of the red sub-pixel, the green sub-pixel, and the blue sub-pixel. In some embodiments, the multiple rows of sub-pixels and the multiple columns of sub-pixels may further include a fourth type of sub-pixels, which is, for example, a white sub-pixel, for emitting white light. In other embodiments, one of the first type of sub-pixels, the second type of sub-pixels, and the third type of sub-pixels may be a white sub-pixel.

For example, in each row, the first type of sub-pixels, the second type of sub-pixels, and the third type of sub-pixels are arranged circularly. Taking the first type of sub-pixels being the red sub-pixels R, the second type of sub-pixels being the green sub-pixels G, and the third type of sub-pixels being the blue sub-pixels B as an example, as shown in FIG. 2, the three sub-pixels of R/G/B are arranged circularly in each row to form an arrangement of R, G, B, R, G, B, R . . . . When the display substrate contains other types of sub-pixels, the first type of sub-pixels, the second type of sub-pixels, the third type of sub-pixels, and the other types of sub-pixels may be arranged circularly together. For example, in each column, the same type of sub-pixels may be arranged as, e.g., a first column of sub-pixels are red sub-pixels R, a second column of sub-pixels are green sub-pixels G, a third column of sub-pixels are blue sub-pixels B, and the like.

For example, a pixel may include at least one first type of sub-pixel, at least one second type of sub-pixel, and at least one third type of sub-pixel. In some other embodiments, a pixel may further include at least one other type of sub-pixel, such as a white sub-pixel. The embodiment of the present disclosure is illustrated as an example of a pixel is composed of one first type of sub-pixel, one second type of sub-pixel, and one third type of sub-pixel, e.g., every three sub-pixels in a row may constitutes a pixel.

For example, the multiple sub-pixels in each row are connected to two of the multiple gate scanning signal lines, and the two gate scanning signal lines are connected to an odd-numbered column of sub-pixels and an even-numbered column of sub-pixels of the multiple sub-pixels, respectively.

For example, two adjacent rows of sub-pixels in multiple rows of sub-pixels are illustrated in FIG. 2. For case of description, such adjacent rows of sub-pixels are referred to as an ith row of sub-pixels and an (i+1)th row of sub-pixels, respectively (i is a positive integer). Furthermore, four gate scanning signal lines, Gate N, Gate N+1, Gate N+2, and Gate N+3, of the multiple gate scanning signal lines are also illustrated in FIG. 2 (N is a positive integer). The ith row of sub-pixels are connected to an Nth gate scanning signal line Gate N and an (N+1)th gate scanning signal line Gate N+1 (N is a positive integer), the (i+1)th row of sub-pixels are connected to an (N+2)th gate scanning signal line Gate N+2 and an (N+3)th gate scanning signal line Gate N+3, and so on. Each row of sub-pixels are connected to two gate scanning signal lines. As an example, multiple sub-pixels in the ith row of sub-pixels are alternately located in odd-numbered columns and even-numbered columns, e.g., a first sub-pixel is located in an odd-numbered column (a first column), a second sub-pixel is located in an even-numbered column (a second column), a third sub-pixel is located in an odd-numbered column (a third column), a fourth sub-pixel is located in an even-numbered column (a fourth column), and so on. The gate scanning signal line Gate N is connected to the even-numbered columns of sub-pixels in the row, that is, it is connected to the even-numbered sub-pixels such as the 2nd, 4th, 6th, and 8th sub-pixels in the row. The gate scanning signal line Gate N+1 is connected to the odd-numbered columns of sub-pixels in the row, that is, it is connected to the odd-numbered sub-pixels such as the 1st, 3rd, 5th, and 7th sub-pixels in the row. The other rows of sub-pixels are connected to the gate scanning signal lines in the same relationship.

For example, the two gate scanning signal lines connected to the same row of sub-pixels include a first gate scanning signal line connected to one of an even-numbered column of sub-pixels and an odd-numbered column of sub-pixels in the corresponding row and a second gate scanning signal line connected to the other one of them.

For example, for ease of differentiation, in some embodiments, for each row of sub-pixels, a gate scanning signal line connecting multiple even-numbered sub-pixels is referred to as a first gate scanning signal line, and a gate scanning signal line connecting multiple odd-numbered sub-pixels is referred to as a second gate scanning signal line. For example, as shown in FIG. 2, the gate scanning signal line Gate N is connected to even-numbered columns of sub-pixels in row i, and the gate scanning signal line Gate N may be referred to as a first gate scanning signal line; the gate scanning signal line Gate N+1 is connected to odd-numbered columns of sub-pixels in the ith row, and the gate scanning signal line Gate N+1 may be referred to as a second gate scanning signal line. Similarly, the gate scanning signal line Gate N+2 may be a first gate scanning signal line, and the gate scanning signal line Gate N+3 may be a second gate scanning signal line.

For example, in some other embodiments, for each row of sub-pixels, the gate scanning signal line connecting multiple odd-numbered sub-pixels may be referred to as a first gate scanning signal line, and the gate scanning signal line connecting multiple even-numbered sub-pixels may be referred to as a second gate scanning signal line. In this case, Gate N and Gate N+2 are second gate scanning signal lines, and Gate N+1 and Gate N+3 are first gate scanning signal lines.

For example, the following is an example of the first gate scanning signal line connecting even-numbered sub-pixels in a row and the second gate scanning signal line connecting odd-numbered sub-pixels in a row.

For example, each of the multiple data signal lines (except a data signal line located at the edge) connects two columns of sub-pixels of the same type. The data signal line located at the edge may be connected to one column of sub-pixels, and in addition, each of the remaining multiple data signal lines may be connected to two columns of sub-pixels, e.g., two adjacent columns of sub-pixels of the same type may share one data signal line.

For example, FIG. 2 shows adjacent six columns of sub-pixels in the multiple columns of sub-pixels. For ease of description, the adjacent six columns of sub-pixels are referred to as a jth column to a (j+5)th column of sub-pixels (j is a positive integer). Furthermore, FIG. 2 shows four data signal lines Data M−1, Data M, Data M+1, and Data M+2 (M is an integer greater than 1) of the multiple data signal lines. A jth column of sub-pixels and a (j+3)th column of sub-pixels are adjacent sub-pixels R of the same type. An Mth data signal line Data M may be connected to the jth column of sub-pixels and the (j+3)th column of sub-pixels to provide data signals for the jth column of sub-pixels and the (j+3)th column of sub-pixels, respectively. A (j+2)th column of sub-pixels and a (j+5)th column of sub-pixels are adjacent sub-pixels B of the same type. A (M+1)th data signal line Data M+1 may be connected to the (j+2)th column of sub-pixels and the (j+5)th column of sub-pixels to provide data signals for the (j+2)th column of sub-pixels and the (j+5)th column of sub-pixels, respectively. An (M−1)th data signal line Data M−1 may be connected to a (j+1)th column of sub-pixels. In the case where j is greater than 2, the data signal line Data M−1 may also be connected to a (j−2)th column of sub-pixels (which is of the same type G as the (j+1)th column of sub-pixels). An (M+2)th data signal line Data M+2 may be connected to a (j+4)th column of sub-pixels, and in addition, the data signal line Data M+2 may be connected to a (j+7)th column of sub-pixels (of the same type G as the (j+4)th column of sub-pixels).

For example, the controller 120 may be connected to an SOC (System on Chip) to receive pixel data of a to-be-displayed image frame from the SOC, send a data signal to the data drive unit 140 and send a clock signal to the gate drive unit 130 according to the pixel data of the to-be-displayed image frame. The gate drive unit 130 is connected to the multiple gate scanning signal lines and sends a gate scanning signal to a gate scanning signal line corresponding to the clock signal according to the clock signal. The data drive unit 140 is connected to the multiple data signal lines to send corresponding data signals to the multiple data signal lines. For example, the data drive unit may include multiple data driver chips, and the data driver chips send corresponding data signals by adjusting data voltages.

Figure 3:
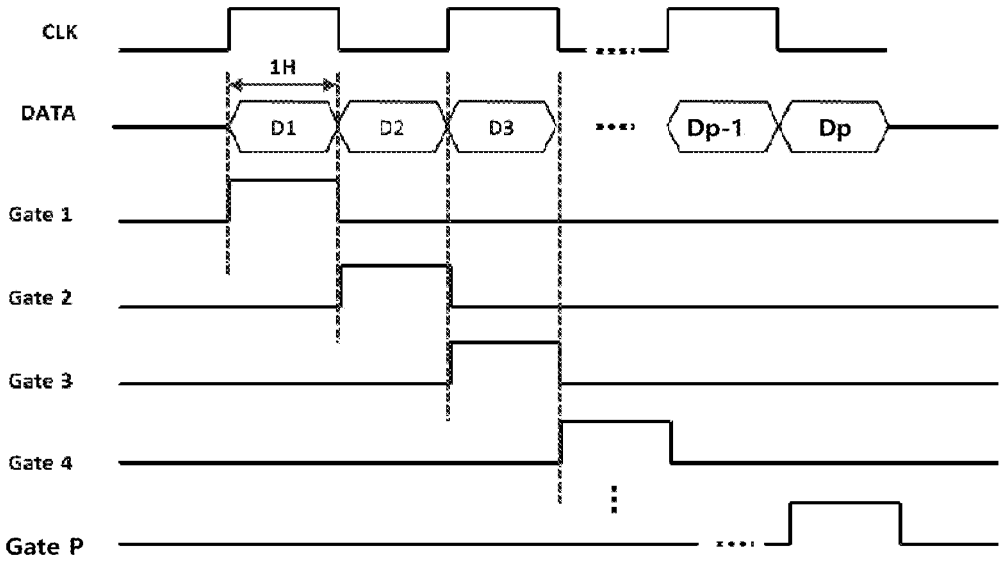
FIG. 3 is a schematic diagram of a corresponding relationship between gate scanning signal drive timing and data signals.

FIG. 3 is a schematic diagram of a corresponding relationship between gate scanning signal drive timing and data signals. As shown in FIG. 3, under the action of a clock signal CLK, the gate driver unit controls multiple gate scanning signal lines (Gate 1 to Gate P, where P is a positive integer greater than 1) to drive sequentially, i.e., to sequentially shift to output gate scanning signals. If only one gate scanning signal line is connected to each row of sub-pixels, the multiple gate scanning signal lines may drive sequentially to turn on multiple rows of sub-pixels one by one. Each gate scanning signal line drives for a time of 1H (the duration of 1H may be set according to requirements, e.g., a display resolution and a display refresh rate). Within each duration of 1H, the data driver unit sends a set of data signals to the multiple data signal lines. For example, if a gate scanning signal line Gate 1 is connected to a first row of sub-pixels, in the duration of 1H corresponding to Gate 1, Gate 1 drives the first row of sub-pixels to be on, and the data drive unit sends data signals D1 to the multiple data signal lines so as to input the set of data signals D1 into the first row of sub-pixels. Similarly, when the gate scanning signal lines Gate 2 to Gate P drive a 2nd row of sub-pixels to a Pth row of sub-pixels to be on, respectively, data signals D2 to Dp may be input into the 2nd row of sub-pixels to the Pth row of sub-pixels, respectively. With the cooperation of the gate drive unit and the data drive unit, the display panel has a display screen corresponding to image data sent by the SOC.

For example, in the case that each row of sub-pixels are connected to two gate scanning signal lines shown in FIG. 2, not only can the multiple rows of sub-pixels be turned on line by line under timing driving of the multiple gate scanning signal lines, but also, for each row of sub-pixels, the even-numbered sub-pixels and the odd-numbered sub-pixels can be turned on sequentially. For example, the even-numbered sub-pixels and the odd-numbered sub-pixels of the first row of sub-pixels are connected to the gate scanning signal lines Gate 1 and Gate 2, respectively. During the driving of the gate scanning signal line Gate 1, the even-numbered sub-pixels in the first row are on, and a set of data signals D1 may be written into the even-numbered sub-pixels in the first row. During the driving of the gate scanning signal line Gate 2, the odd-numbered sub-pixels in the first row are on, and another set of data signals D2 may be written into the odd-numbered sub-pixels in the first row. In this solution, the data signals may include D1 to D2$p$.

For example, each pixel presents a color related to the brightness of multiple sub-pixels it contains. For display brightness, the brightness may be divided into multiple grayscales (e.g., 64, 128, 256, or 1024, etc.), and each grayscale corresponds to a different data voltage. The lowest grayscale corresponds to a smallest data voltage, causing sub-pixels to present a darkest color (e.g., black), and the highest grayscale corresponds to a largest data voltage, causing the sub-pixel to present a brightest color (e.g., white). For example, if a pixel contains multiple sub-pixels that are all of the lowest grayscale, the pixel presents black; if a pixel contains multiple sub-pixels that are all of the highest grayscale, the pixel presents white. It is to be noted that the "highest" and "lowest" described in the embodiments of the present disclosure are relative to a certain range. For example, the grayscale is in the range of 0 to 255, the highest grayscale may be understood as the maximum value (i.e., 255) in the range, and the lowest grayscale may be understood as the minimum value (i.e., 0) in the range.

Figure 4:
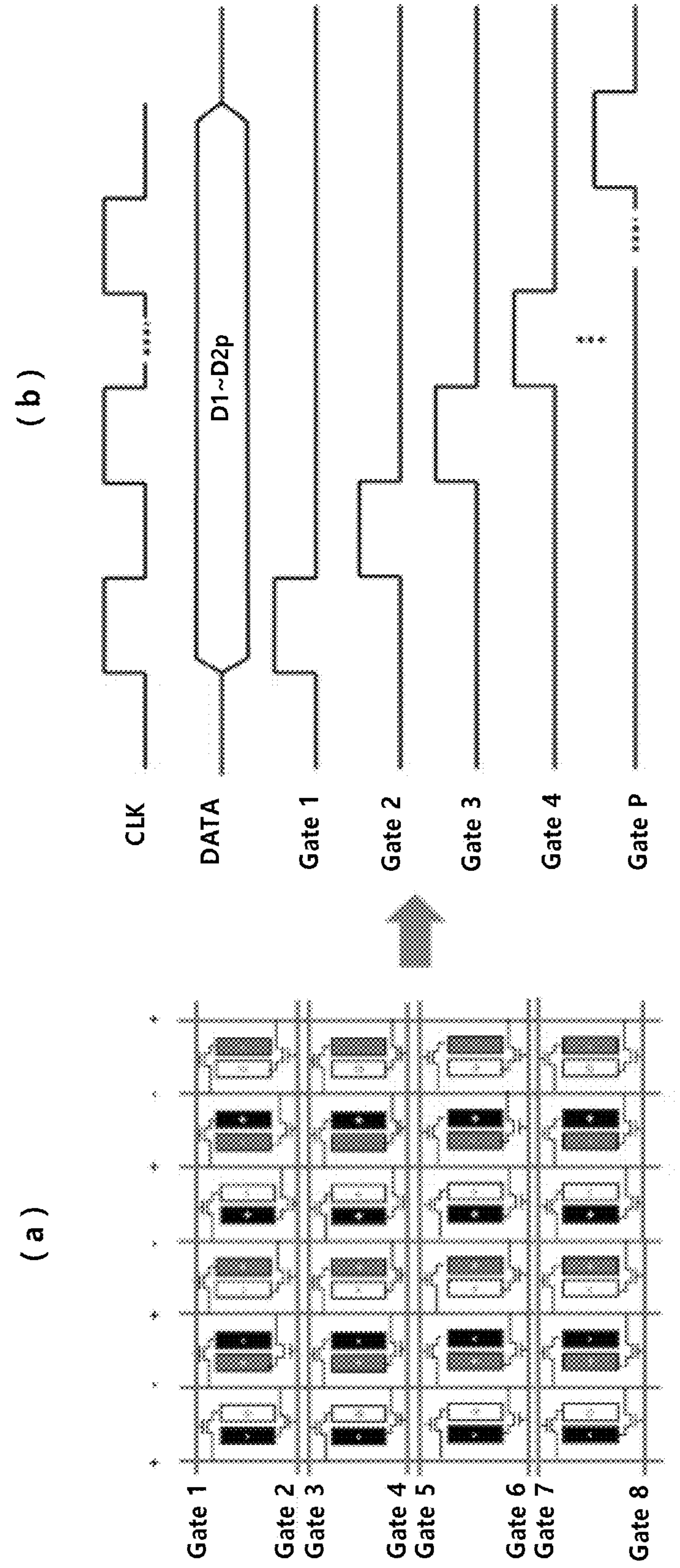
FIG. 4 is a schematic diagram of gate scanning signal drive timing and data signals that correspond to a display screen.

FIG. 4 is a schematic diagram of gate scanning signal drive timing and data signals that correspond to a display screen. As shown in part (a) of FIG. 4, for example, the display screen is a pure-white screen, and after the SOC sends the pure-white screen to the controller 120, the controller 120 may send pixel data of the screen to the data driver chip. For the pure-white screen, optionally, multiple rows of sub-pixels and multiple columns of sub-pixels all correspond to the highest grayscale, and each row of sub-pixels corresponds to the same data voltage. As shown in part (b) of FIG. 4, the multiple gate scanning signal lines Gate 2 to Gate P shift row by row to output gate scanning signals. Since the data voltages corresponding to the multiple rows of sub-pixels and multiple columns of sub-pixels are the same, the data voltage of the multiple data signal lines basically does not change during the driving of the multiple gate scanning signal lines Gate 2 to Gate P line by line. Similarly, if the display screen is in other solid colors, such as pure black, the data voltage of the multiple data signal lines also basically does not change, and power consumption is low in this case. However, when the display screen is not in a solid color, the data voltage of at least some of the data signal lines jumps in the process that the multiple gate scanning signal lines Gate 2 to Gate P output signals line by line, which makes the power consumption rise.

Figure 5:
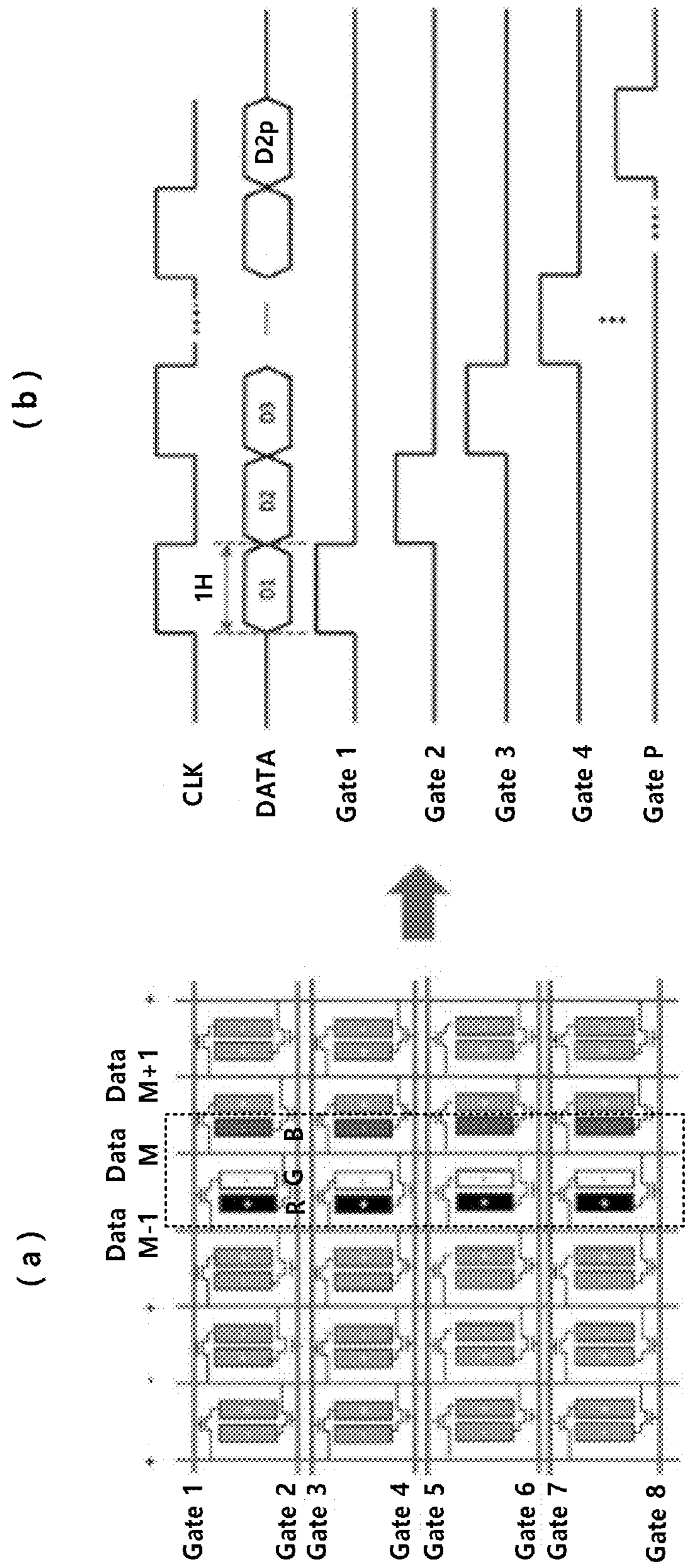
FIG. 5 is a schematic diagram of gate scanning signal drive timing and data signals that correspond to another display screen.

FIG. 5 is a schematic diagram of gate scanning signal drive timing and data signals that correspond to another display screen. As shown in part (a) of FIG. 5, for example, the other display screen is a screen with bright vertical lines, and for example, a column of pixels consisting of three columns of sub-pixels inside the dashed box present white and other pixels outside the dashed box present black. The sub-pixels inside the dashed box correspond to the highest grayscale and the other sub-pixels correspond to the lowest grayscale. For this screen, if a conventional drive method is adopted, as shown in part (b) of FIG. 5, during a first duration of 1H, Gate 1 drives even-numbered sub-pixels in a first row of sub-pixels to be on; in the dashed box, a sub-pixel G is in an on state, and sub-pixels R and B are in an off state, and during this period, data signals D1 are output to the first row of sub-pixels through multiple data signal lines. A data signal line Data M−1 connected to the sub-pixel G in the first row in the dashed box outputs, for example, a high level, so that this sub-pixel G is of the highest grayscale, and the remaining data signal lines (including data signal lines Data M and Data M+1) output, for example, a low level. During a next duration of 1H, Gate 2 drives odd-numbered sub-pixels in the first row of sub-pixels to be on; in the dashed box, sub-pixels R and B are in an on state and a sub-pixel G is in an off state, and during this period, data signals D2 are output to the first row of sub-pixels through the multiple data signal lines. The data signal lines Data M and Data M+1 connected to the sub-pixels R and B in the first row in the dashed box output, for example, a high level, so that the sub-pixels R and B are of the highest grayscale, and the remaining data signal lines (including a data signal line Data M−1) output, for example, a low level. Within a further duration of 1H, the data signal line Data M−1 jumps back to a high level, and the data signal lines Data M and Data M+1 jump back to a low level. Thus, in this drive method, the data signal lines undergo a cyclic jump, and the data signal lines have a jump every duration of 1H, for example, have a jump between a low level and a high level, and each stage is maintained for a duration of 1H while the jump cycle is 2H. With this method, the voltage of at least some of the data signal lines jumps at a higher frequency, resulting in a higher power consumption and a high temperature of the data driver chip.

For example, for some other reload screens, if the conventional drive method is adopted, for each frame, the voltage of all or some of the data signal lines will have frequent jumps, resulting in the higher power consumption and temperature rise of the chip. Moreover, with the rapid jumps of the voltage on the data driver chip and the short time for transfer of each data, the impact of the difference in the transfer delay due to the difference in the resistance of the data signal lines becomes more obvious, which is prone to causing the problem of vertical stripes in display.

For example, the reload screen is a screen that causes frequent jumps in the voltage of at least some of the data signal lines, and the frequent jumps may be understood, for example, as the jump cycle being less than 4H or less than a display duration of a frame. In some embodiments, the reload screen may include a screen in which multiple columns of pixels alternately present black and white (referred to as a V-1line screen), for example, the odd-numbered column of pixels present white and the even-numbered column of pixels present black. In some other embodiments, the reload screen may also include a screen in which multiple rows of pixels alternately present black and white (referred to as an H-1 line screen), for example, the odd-numbered row of pixels present white and the even-numbered column of pixels present black. In some other embodiments, the reload screen may include a checkerboard screen (referred to as a 1V1H screen), for example, pixels alternatively present black and white in the row direction and in the column direction. That is, when the reload screen is displayed, the screen data signals including data signals in at least adjacent rows and/or columns have a large difference in grayscale, for example, adjacent rows and/or columns are displayed with a grayscale of 255 and a grayscale of 0, or a grayscale of 255 and a grayscale of 127, or a grayscale of 127 and a grayscale of 0, and the like, respectively, that differ by a certain grayscale range. Optionally, the grayscale difference is at least greater than or equal to a grayscale of 30, which is not limited thereto.

The display apparatus of the embodiments of the present disclosure may solve the above problems. The display apparatus of the embodiments of the present disclosure includes a control unit. The control unit is configured to trigger an image conversion operation and a clock conversion operation depending on a to-be-displayed image frame being an image of a preset type, in which the image conversion operation is used for converting the to-be-displayed image frame into at least one target image frame corresponding to the preset type by controlling a data signal, and the clock conversion operation is used for converting multiple initial clock signals into at least one set of clock signals corresponding to the at least one target image frame by controlling a clock signal.

For example, the image of the preset type include, for example, the V-1line screen, H-1line screen, and 1V1H screen described above, and may also include other screens, such as a screen in which a voltage jump cycle of at least some of the data signal lines is less than the display duration of a frame.

For example, triggering an image conversion operation and a clock conversion operation may include the control unit performing the image conversion operation and the clock conversion operation, or the control unit controlling other units to perform the image conversion operation and the clock conversion operation. For example, the image conversion operation may convert the image of a predetermined type into at least one target image frame. For example, the at least one target image frame refers to consecutive image frames. For example, the to-be-displayed image frame is converted into two or three consecutive target image frames. For example, in each of the target image frames, a difference value in grayscales corresponding to the same type of sub-pixels is not greater than a second threshold. If the overall grayscale range is 0 to 255, 0 indicates the lowest grayscale and 255 indicates the highest grayscale. The second threshold is, for example, a value between 0 and 50, such as 0 or 20 or 30. When the second threshold is 0, the same type of sub-pixels correspond to the same grayscale. When the second threshold value is a value such as 20 or 30, the difference between the grayscales corresponding to the same type of sub-pixels is very small, and the present disclosure does not limit the specific value of the second threshold value, which can be determined according to the actual situation. For example, in each of the target image frames, the grayscale corresponding to the same type of sub-pixels lies in a certain grayscale range, for example, in the grayscale range of 0 to 50, or in the grayscale range of 200 to 255, so that the same type of sub-pixels present an overall darker or brighter effect.

For example, in one target image frame, all red sub-pixels R and blue sub-pixels B correspond to a grayscale range of 235 to 255, and all green sub-pixels G correspond to a grayscale range of 0 to 20.

For example, a corresponding set of clock signals may be obtained for each target image frame by the image conversion operation. For example, each of the at least one set of clock signals above is some of the multiple initial clock signals. For example, the initial clock signals are clock signals capable of driving the multiple gate scanning signal lines (e.g., Gate 1 to Gate P) to sequentially shift to output gate scanning signals, as shown in FIG. 3, such that each of the gate scanning signal lines outputs a gate scanning signal. A set of clock signals corresponding to each target image frame is obtained by controlling the clock signals. Each set of clock signals is, for example, some of the initial clock signals for driving a part of the gate scanning signal lines (e.g., Gate 1 to Gate P) of the multiple gate scanning signal lines to sequentially shift to output the gate scanning signals.

For example, for each target image frame, the data drive unit outputs corresponding data signals to the multiple data signal lines on the basis of pixel data of the target image frame, and the gate drive unit sequentially shifts to output gate scanning signals to a part of the multiple gate scanning signal lines on the basis of the corresponding set of clock signals.

For example, the part of gate scanning signal lines output the gate scanning signals such that some of the sub-pixels in the display substrate are turned on, causing a part of screen of each target image frame to be output. Accordingly, by the cooperative operation of the data drive unit and the gate drive unit, the part of screen of each target image frame is output. Through persistence of vision, a part of screen of at least one target image frame (e.g., two target image frames) is output continuously for a short period of time, so that an effect of superimposing the part of screen of at least one target image frame (e.g., two target image frames) can be presented visually, the superimposed screen corresponding to an image of the to-be-displayed image frame, and thus, output of the screen of the to-be-displayed image frame is achieved. Moreover, for each target image frame, the same type of sub-pixels correspond to the same grayscale or within a certain grayscale range, accordingly, voltage variation of the data signal is less than a first threshold value when the gate drive unit sequentially shifts to output the gate scanning signals to the part of the gate scanning signal lines, for each of the target image frames. For example, in some embodiments, if the same type of sub-pixels in each target image frame correspond to the same grayscale, the voltage of the data signal may remain unchanged, i.e., the voltage variation is 0. As a result, the voltage variation of the data signal line is essentially unchanged (unchanged or with a small variation) during an output duration of each target image frame, and the voltage jump cycle of the data signal lines is greater than the display duration of one frame. Compared with the conventional drive method, the drive method has the advantages that the jump cycle is extended to a greater extent, and the rapid jump of the data voltage on the data driver chip in the reload screen is avoided, thereby lowering power consumption of the driver chip and reducing the temperature. Moreover, since the rapid jump of the voltage on the data driver chip is avoided, the impact of the difference in resistance on the data lines is weakened, and the problem of vertical stripes on the reload screen can be solved.

The display apparatus of the embodiments of the present disclosure will be further described and illustrated in the following with the V-1line screen, the H-1line screen, and the 1V1H screen.

For example, the preset type includes a first type, in which pixel data of an ith row of pixels and pixel data of an (i+1)th row of pixels of an image of the first type correspond to a first grayscale range and a second grayscale range, respectively, the first grayscale range is larger than the second grayscale range, where i is a positive integer.

For example, the first type is, for example, an H-1line type, and a screen of the H-1line type may include, in addition to a case in which multiple rows of pixels alternately present black and white, a case in which multiple rows of pixels alternately present different brightness ranging from light to dark, for example, black, gray, and white alternately. This type of screen includes at least two rows of pixels corresponding to two different grayscales, respectively. The embodiment of the present disclosure is described with an ith row of pixels and an (i+1)th row of pixels, the ith row of pixels correspond to a first grayscale range, the first grayscale range is, for example, a grayscale range that is brighter, for example, from 235 to 255, and the (i+1)th row of pixels correspond to a second grayscale range, the second grayscale range is, for example, a grayscale range that is darker, for example, from 0 to 20. For case of description, the following is illustrated as an example of black and white alternating, where the ith row of pixels correspond to a grayscale of 255 and the (i+1)th row of pixel correspond to a grayscale of 0. The ith row of pixels are, for example, pixels in any odd number of rows, and the (i+1)th row of pixels are, for example, pixels in any even number of rows.

Figure 6:
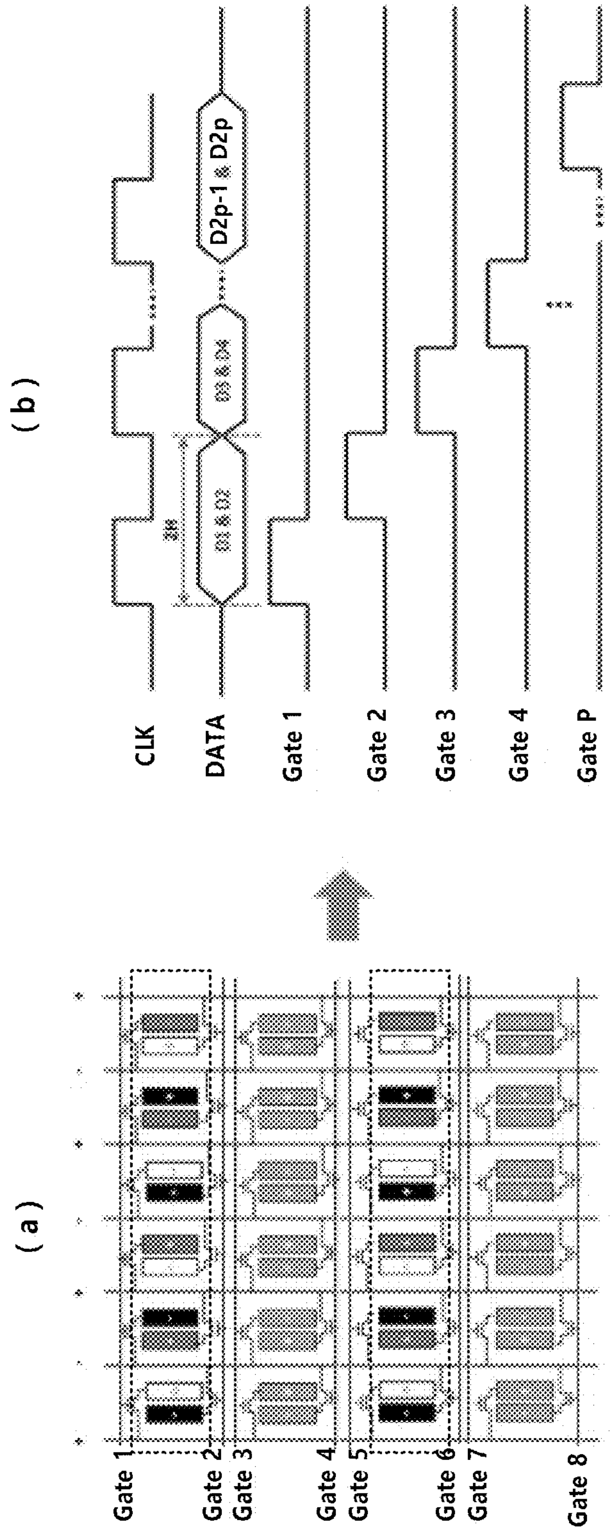
FIG. 6 is a schematic diagram of gate scanning signal drive timing and data signals that correspond to an H-1line screen.

FIG. 6 is a schematic diagram of gate scanning signal drive timing and data signals that correspond to an H-1line screen. As shown in part (a) of FIG. 6, the H-1line screen refers to the one in which, for example, if the odd-numbered rows (i.e., 1st, 3rd, and 5th rows) of pixels present white, the odd-numbered rows of sub-pixels all have a grayscale of 255; and if the even-numbered rows (i.e., 2nd, 4th, and 6th rows) of pixels present black, the even-numbered rows of sub-pixels all have a grayscale of 0. For the H-1line screen (FIG. 6), if the conventional drive method is adopted, the drive timing is shown in part (b) of FIG. 6, with multiple gate scanning signal lines sequentially shifting to output gate scanning signals. Within a duration of 2H where Gate 1 and Gate 2 output gate scanning signals respectively, where H represents the time need for charging a row of pixels, and the parameter is related to the resolution and the display refresh frequency, the multiple data signal lines successively output two sets of data signals, D1 and D2, to the first row of sub-pixels, and since the first row of sub-pixels correspond to a grayscale of 255, the data signals of the multiple data signal lines are all high levels corresponding to the grayscale of 255. As the first row of sub-pixels all correspond to the grayscale of 255, the data signals from the multiple data signal lines are all of a high level corresponding to the grayscale of 255. In the duration of 2H where Gate 3 and Gate 4 respectively output gate scanning signals, the multiple data signal lines successively output two sets of data signals D3 and D4 to the second row of sub-pixels, and since the second row of sub-pixels correspond to a grayscale of 0, the data signals of the multiple data signal lines all jump to a low level corresponding to the grayscale of 0. In a next duration of 2H, the data signals of the multiple data signal lines jump back to a high level, and so on. Therefore, by the conventional drive method, the jump cycle of the data signal is 4H, the jump frequency is high, while power consumption and temperature of the data driver chip are high. The display apparatus of the embodiments of the present disclosure can solve the problem. The following describes the processing of the H-1line screen shown in part (a) of FIG. 6 by the display apparatus according to an embodiment of the present disclosure.

For example, in an embodiment of the present disclosure, the to-be-displayed image frame is of the first type, the at least one target image frame includes a first image frame, in which the pixel data of the ith row of pixels and the pixel data of the (i+1)th row of pixels of the first image frame both correspond to the first grayscale range. When the target image frame is the first image frame, the part of the gate scanning signal lines include a gate scanning signal line connected to sub-pixels of the ith row of pixels.

For example, the image of the first type refers to an image in which an odd-numbered row of pixels and an even-numbered row of pixels alternate between a first grayscale range and a second grayscale range. Pixel data of all sub-pixels of the first image frame corresponds to the one having a greater brightness of the first grayscale range and the second grayscale range. When the target image frame is the first image frame, the part of the gate scanning signal lines include a gate scanning signal connected to an odd-numbered row of sub-pixels among the multiple rows of sub-pixels, or include a gate scanning signal line connected to an even-numbered row of sub-pixels among the multiple rows of sub-pixels.

Figure 7:
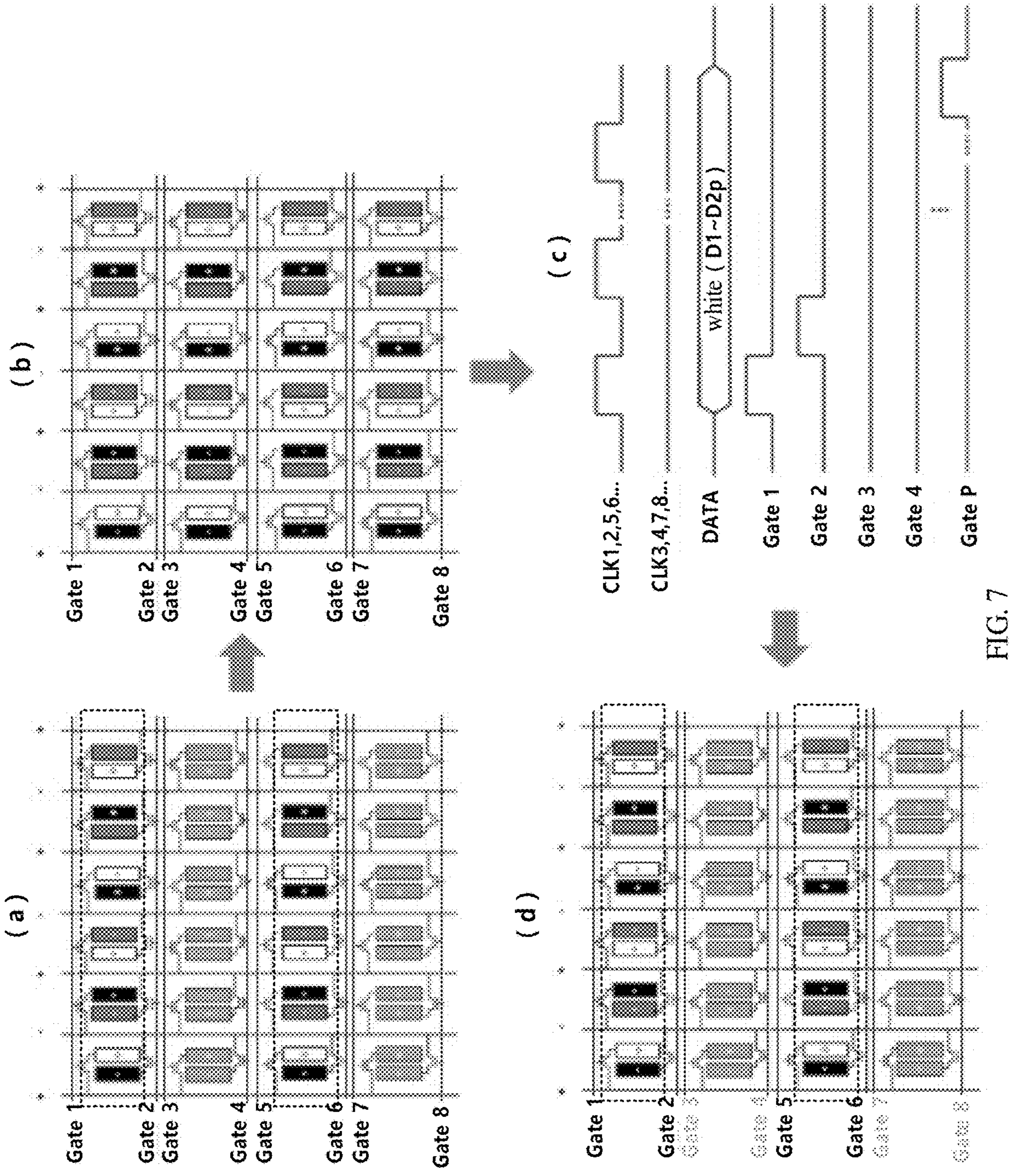
FIG. 7 is a schematic diagram of an image data conversion and a gate scanning signal drive timing according to at least one embodiment of the present disclosure.

FIG. 7 is a schematic diagram of an image data conversion and a gate scanning signal drive timing according to at least one embodiment of the present disclosure. As shown in part (a) of FIG. 7, for example, the odd-numbered rows of sub-pixels in the H-1line image frame are all of a grayscale of 255 and the even-numbered rows of sub-pixels are all of a grayscale of 0. The H-1line image frame may be converted to the first image frame shown in part (b) of FIG. 7. In the first image frame, all of the sub-pixels are of, for example, a grayscale of 255 with a higher brightness, of the grayscale of 255 and the grayscale of 0. Further, the data signal lines are maintained at a high level at all times during the output of the first image frame. It is to be noted that it is also possible that the sub-pixels of some of the lines all have a higher grayscale of 255, which may also reduce some of the power consumption, which is not limited herein. A set of clock signals corresponding to the first image frame is shown in part (c) of FIG. 7. The clock signals corresponding to the gate scanning signal lines connected to the odd-numbered rows of sub-pixels are turned on (outputting drive signals), while the clock signals corresponding to the gate scanning signal lines connected to the even-numbered rows of sub-pixels are turned off (without drive signal). For example, the clock signals corresponding to the gate scanning signal lines Gate 1 and Gate 2 connected to the 1st row of sub-pixels, the gate scanning signal lines Gate 5 and Gate 6 connected to a 3rd row of sub-pixels, and the gate scanning signal lines Gate 9 and Gate 10 connected to a 5th row of sub-pixels, etc., are turned on, to enable the gate drive unit to generate, according to the set of clock signals, the corresponding gate drive signals, so that the gate scanning signal lines such as Gate 1, Gate 2, Gate 5, Gate 6, Gate 9 and Gate 10 sequentially shift to output gate scanning signals while the remaining gate scanning signals do not output gate scanning signals. On the basis of this approach, it is possible to write the high level transmitted by the data signal lines into the odd-numbered rows of sub-pixels so that the odd-numbered rows of sub-pixels are all of the highest brightness, and accordingly the pixels composed of the odd-numbered rows of sub-pixels present white; moreover, no data signals are written into the even-numbered rows of sub-pixels due to the gate lines being off, so that the pixels composed of the even-numbered rows of sub-pixels present black, thereby realizing output of the H-1line image frame as illustrated in part (a), i.e., reduction of the jump frequency of data signal or reduction of input power consumption without data signal jumps. With continued reference to FIG. 7(*c*), it is to be noted that the figure illustrates that the gate scanning signals are turned on sequentially, e.g., the active level of Gate 1 and the active level of Gate 2 are not overlapped. Optionally, for the gate scanning signals that are turned on, the active levels of adjacent gate scanning signals may also be partially overlapped, with the overlapped portion serving as a precharge phase for the Gate 2. Of course, the part of timing diagrams of other figures may also include the presence of overlapping of adjacent gate scanning signals at active level phase, which is not limited thereto.

With the display apparatus of the embodiments of the present disclosure, the data voltage output from the data driver chip remains unchanged during the output of the first type of image frame, and therefore, compared with the conventional method, the display apparatus of the embodiments of the present disclosure has the advantages extending the jump cycle of the data signal line substantially and reducing power consumption substantially on the basis of the normal output of the first type of image frame.

For example, in an embodiment of the present disclosure, the timing controller (TCON) is used to pre-analyze the to-be-displayed screen; when it is detected that the to-be-displayed screen is an H-1line screen, the drive method is adjusted by the TCON; optionally, for example, the timing controller further includes a storage module and a comparison module, and in the case that the storage module pre-stores the H1line screen, and when the screen transmitted by the SOC passes through the comparison module, it is determined that the screen transmitted from the SOC is consistent with the stored screen, then the drive method is adjusted by means of the TCON. The TCON replaces the H-1line screen with an all-white screen, and at the same time, the TCON only generates corresponding CLK ON waveforms of rows 1, 2, 5, 6, 9 and 10 . . . , and keeps the corresponding CLK in rows 3, 4, 7, 8, 11 and 12 . . . , off, i.e., an alternating manner of two rows being on while two rows off. With this drive method, the data voltage output from the data driver chip remains unchanged in displaying of the H-1line screen, so the power consumption is low.

For example, the preset type includes a second type, pixel data of an odd-numbered column of pixels and pixel data of an even-numbered column of pixels of an image of the second type correspond to a third grayscale range and a fourth grayscale range, respectively, the third grayscale range is different from the fourth grayscale range.

For example, the second type is, for example, a V-1line type, and a screen of the V-1line type may include, in addition to a case in which multiple columns of pixels alternately present black and white, a case in which multiple columns of pixels alternately present different brightness ranging from light to dark, for example, black, gray, and white alternately. For case of description, the following is an example of black and white alternating, e.g., the odd-numbered columns of pixels correspond to a third grayscale range, the third grayscale range is, for example, a grayscale range with a higher brightness, e.g., 235 to 255. The even-numbered columns of pixels correspond to a fourth grayscale range, and the fourth grayscale range is, for example, a grayscale range with a lower brightness, for example, 0 to 20. An embodiment of the present disclosure is illustrated by an example in which the odd-numbered columns of pixels are white (corresponding to a grayscale of 255) and the even-numbered columns of pixels are black (corresponding to a grayscale of 0).

Figure 8:
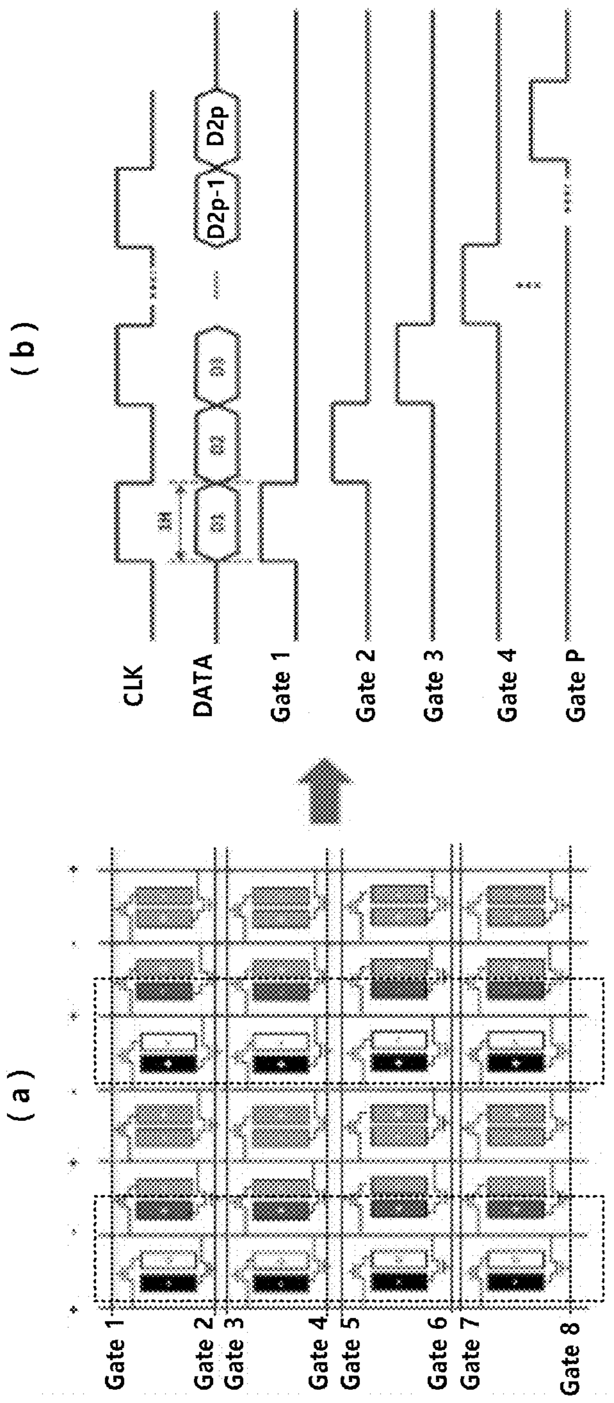
FIG. 8 is a schematic diagram of gate scanning signal drive timing and data signals that correspond to a V-1line screen.

FIG. 8 is a schematic diagram of gate scanning signal drive timing and data signals that correspond to a V-1line screen. As shown in part (a) of FIG. 8, the V-1line screen refers to the one in which, for example, odd-numbered columns of pixels present white, and even-numbered columns of pixels present white. One column of pixels correspond to three columns of sub-pixels, e.g., columns 1 to 3 of sub-pixels form a first column of pixels, and columns 4 to 6 of sub-pixels form a second column of pixels. Therefore, the sub-pixels contained in the odd-numbered columns of pixels such as the sub-pixels of columns 1 to 3 and the sub-pixels of columns 7 to 9, as shown in the dashed box in the figure are all of a grayscale of 255, and the remaining sub-pixels are of a grayscale of 0.

For the V-1line screen, if the conventional drive method is adopted, the drive timing is shown in part (b) of FIG. 8, and multiple gate scanning signal lines sequentially shift to output gate scanning signals. During a first duration of 1H, Gate 1 drives even-numbered sub-pixels in a first row of sub-pixels to be on; in the dashed box, a sub-pixel G is in an on state, and sub-pixels R and B are in an off state, and during this period, data signals D1 are output to the first row of sub-pixels through multiple data signal lines. The data signal line connected to the sub-pixel G in the first row in the dashed box outputs a high level, so that this sub-pixel G is of the highest grayscale, and the remaining data signal lines output, for example, a low level. During a next duration of 1H, Gate 2 drives odd-numbered sub-pixels in the first row of sub-pixels to be on; in the dashed box, sub-pixels R and B are in an on state and a sub-pixel G is in an off state, and during this period, data signals D2 are output to the first row of sub-pixels through multiple data signal lines. The data signal lines connected to the sub-pixels R and B in the first row in the dashed box output, for example, a high level, so that the sub-pixels R and B are of the highest grayscale, and the remaining data signal lines output, for example, a low level. In a further 1H time period, the data signal line jumps back to the voltage corresponding to the first duration of 1H. Therefore, with the conventional drive method, the data signal line undergoes frequent periodic jumps, and the data signal line has a jump once for every duration of 1H. The jump cycle is 2H, the jump frequency is high, and the power consumption and temperature of the data driver chip are high. The display apparatus of the embodiments of the present disclosure can solve this problem. The following describes the processing of the V-1line screen by the display apparatus according to an embodiment of the present disclosure.

For example, when the to-be-displayed image frame is of the second type, the at least one target image frame includes a second image frame and a third image frame that are consecutive. Pixel data of the first type of sub-pixels and pixel data of the third type of sub-pixels in the second image frame correspond to the larger one of the third grayscale range and the fourth grayscale range, and pixel data of the second type of sub-pixels in the second image frame corresponds to the one with a smaller brightness of the third grayscale range and the fourth grayscale range. Pixel data of the second type of sub-pixels in the third image frame corresponds to the one with a greater brightness of the third grayscale range and the fourth grayscale range, and pixel data of the first type of sub-pixels and pixel data of the third type of sub-pixels in the third image frame correspond the one with a smaller brightness of the third grayscale range and the fourth grayscale range.

Figure 9:
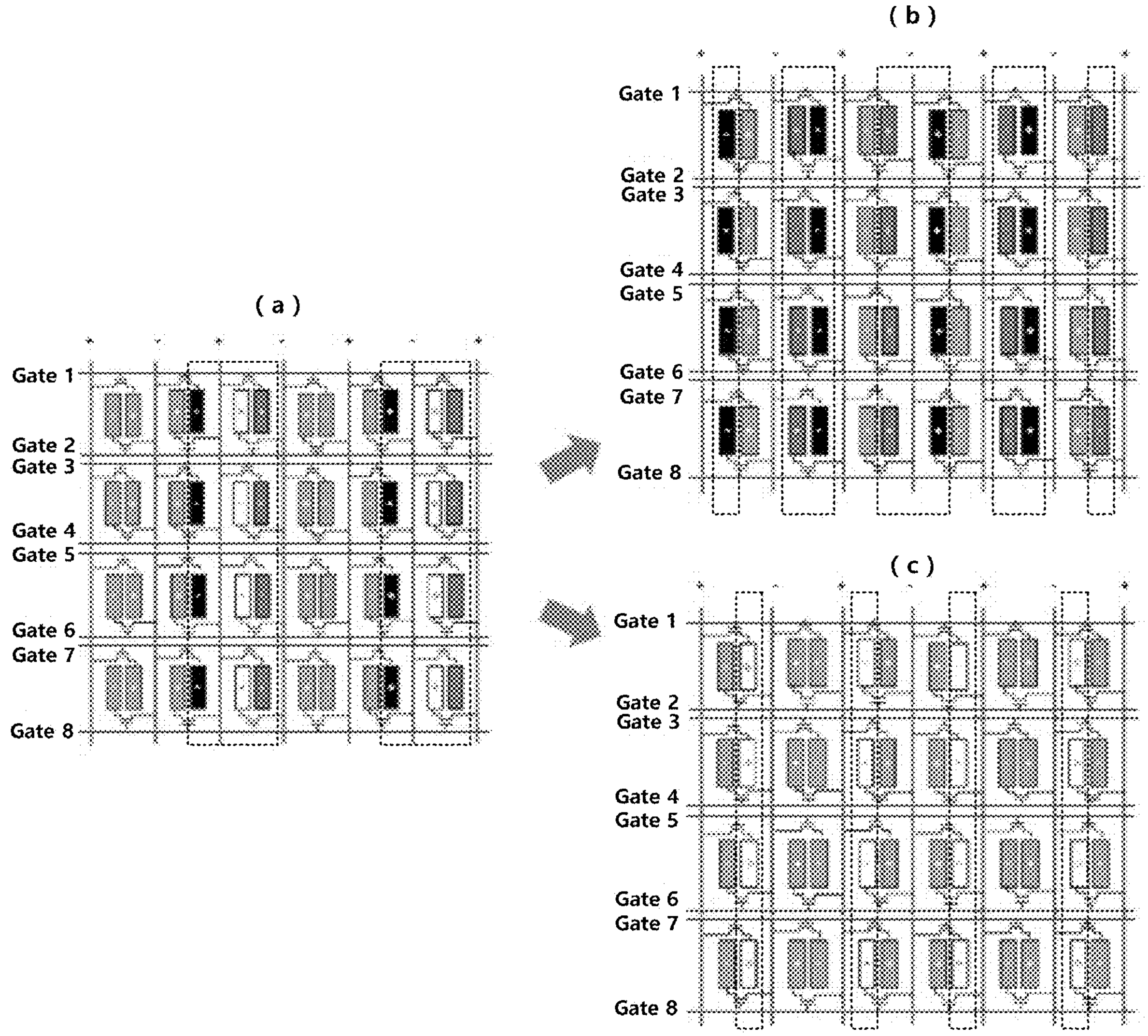
FIG. 9 is a schematic diagram of an image data conversion for the V-1line screen according to at least one embodiment of the present disclosure.

FIG. 9 is a schematic diagram of an image data conversion for the V-1line screen according to at least one embodiment of the present disclosure. As illustrated in part (a) of FIG. 9, for example, at least some of the odd-numbered columns of sub-pixels included in the V-1line image frame are all of a grayscale of 0, and at least some of the even-numbered columns of sub-pixels included are all of a grayscale of 255. The V-1line image frame may be converted into a second image frame and a third image frame illustrated in FIG. 9 in parts (b) and (c), respectively, the second image frame and the third image frame are consecutive frames. In the second image frame, all of the sub-pixels R and sub-pixels B are, for example, of a grayscale of 255 with higher brightness, and all of the sub-pixels G are, for example, of a grayscale of 0 with lower brightness, and thus the data signal lines connected to the sub-pixels R and the sub-pixels B are always maintained at a high level, and the data signal lines connected to the sub-pixels G are always maintained at a low level during output of the second image frame. In the third image frame, all of the sub-pixels G are of a grayscale of 255, and all of the sub-pixels R and the sub-pixels B are, for example, of a grayscale of 0, and thus, during the output of the third image frame, the data signal lines connected to the sub-pixels R and the sub-pixels B are always maintained at a low level, and the data signal lines connected to the sub-pixels G are always maintained at a high level.

For example, when the target image frame is the second image frame, the part of the gate scanning signal lines that transmit the gate scanning signals include a first part of the gate scanning signal lines; and when the target image frame is the third image frame, the part of the gate scanning signal lines that transmit the gate scanning signals include a second part of the gate scanning signal lines. The first part of gate scanning signal lines include multiple first gate scanning signal lines respectively connected to the multiple rows of sub-pixels, and the second part of gate scanning signal lines include multiple second gate scanning signal lines respectively connected to the multiple rows of sub-pixels.

Figure 10:
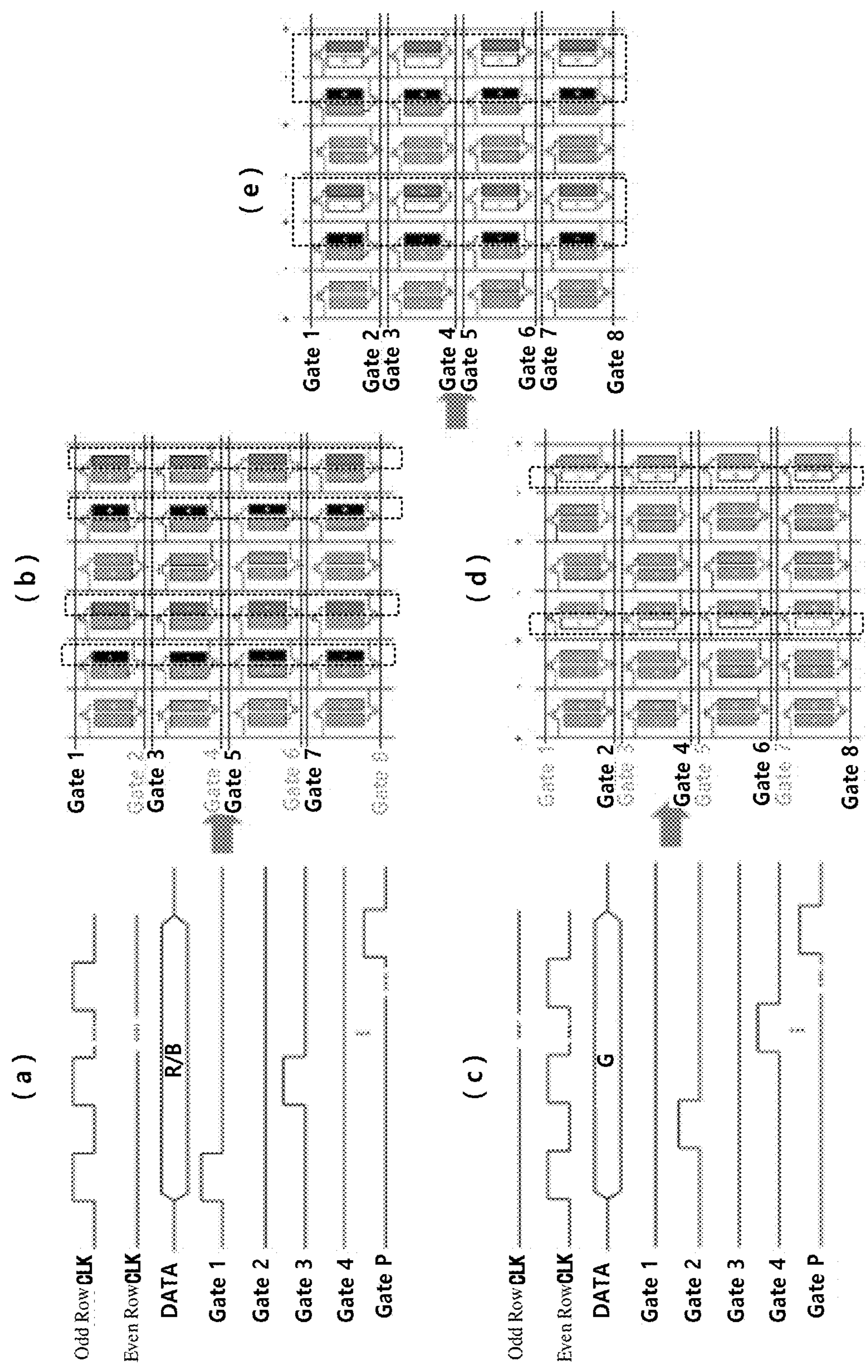
FIG. 10 is a schematic diagram of gate scanning signal drive timing for the V-1line screen according to at least one embodiment of the present disclosure.

FIG. 10 is a schematic diagram of gate scanning signal drive timing for the V-1line screen according to at least one embodiment of the present disclosure. For example, the set of clock signals corresponding to the second image frame shown in part (b) of FIG. 9 is referred to that in part (a) of FIG. 10. If the first gate scanning signal line is a gate scanning signal line connected to an even-numbered sub-pixels in each row, as shown in FIG. 9, the first gate scanning signal lines are gate scanning signal lines in odd-numbered rows such as the 1st, 3rd, 5th, and 7th row. If the second gate scanning signal line is a gate scanning signal line connected to an odd-numbered sub-pixels in each row, as shown in FIG. 9, the second gate scanning signal lines are gate scanning signal lines in even-numbered rows such as the 2nd, 4th, 6th, and 8th row. Therefore, for the second image frame, the clock signal corresponding to each odd-numbered row of gate scanning signal line may be turned on, and the clock signal corresponding to each even-numbered row of gate scanning signal line may be turned off, so that the gate drive unit can generate corresponding gate drive signals according to this set of clock signals, the gate scanning signal lines such as Gate 1, Gate 3, Gate 5, Gate 7, and Gate 9, sequentially shift to output gate scanning signals, while the remaining gate scanning signals do not output gate scanning signals. On the basis of this approach, the even-numbered columns of sub-pixels can be turned on so that, in the process that the data signal lines output data signals, the sub-pixels R and the sub-pixels B of the even-numbered columns in the second image frame shown in part (b) of FIG. 9 are written with the data signals, and no data signals are written to the sub-pixels R and the sub-pixels B of the odd-numbered columns, so that some of the sub-pixels R and the sub-pixels B in the second image frame shown in part (b) of FIG. 9 have a higher brightness, obtaining the screen shown in part (b) of FIG. 10 (the sub-pixels in the dashed frame have a grayscale of 255 and the remaining sub-pixels have a grayscale of 0).

For example, the set of clock signals corresponding to the third image frame shown in part (c) of FIG. 9 is referred to that in part (c) of FIG. 10. For the third image frame, the clock signal corresponding to each odd-numbered row of gate scanning signal line may be turned off, and the clock signal corresponding to each even-numbered row of gate scanning signal line may be turned on, so that the gate drive unit can generate corresponding gate drive signals according to this set of clock signals, the gate scanning signal lines, such as Gate 2, Gate 4, Gate 6, Gate 8 sequentially shift to output gate scanning signals while the remaining odd-numbered line gate scanning signals do not output gate scanning signals. The on and off states of each gate scanning signal line in the third image frame are opposite to those in the second image frame. On the basis of this approach, the odd-numbered columns of sub-pixels can be turned on so that, in the process that the data signal lines output data signals, no data signals are written into the sub-pixels G in the even-numbered columns in the third image frame shown in part (c) of FIG. 9, and the sub-pixels G in the odd-numbered columns are written with the data signals, so that some of the sub-pixels G in the third image frame shown in part (c) of FIG. 9 have a higher brightness, obtaining the frame shown in part (d) of FIG. 10 (the sub-pixels in the dashed box have a grayscale of 255, and the remaining sub-pixels have a grayscale of 0).

For example, the screen shown in part (b) of FIG. 10 and the screen shown in part (d) are output consecutively within a short period of time, and according to persistence of vision of the human eye, the effect of superimposing these two screens can be presented visually, and the superimposed screen is shown in part (e) of FIG. 10. The screen in this part (e) is consistent with the V-1line screen shown in part (a) of FIG. 9, and thus screen output of the to-be-displayed image frame is realized. Moreover, for each target image frame, sub-pixels of the same type correspond to the same grayscale or are within a certain grayscale range, and therefore, voltage variation of the data signal is substantially maintained when the gate drive unit shifts to output the gate scanning signals to the part of the gate scanning signal lines, for each of the target image frames.

According to the display apparatus of the embodiments of the present disclosure, during the output of the second type of image frame, the data voltage output by the data driver chip remains substantially unchanged in the output duration of a frame, i.e., the voltage jump cycle of the data signal line is greater than the display duration of a frame. Therefore, compared with the conventional method, the display apparatus of the embodiments of the present disclosure has the advantages extending the jump cycle of the data signal line substantially, reducing power consumption substantially, and being capable of lowering temperature of the chip and avoiding vertical stripes, on the basis of the normal output of the second type of image frame.

For example, according to an embodiment of the present disclosure, the TCON (timing controller) is used to pre-analyze the to-be-displayed screen, and when it is detected that the to-be-displayed screen is a V-1line screen, then the drive method is adjusted by means of the TCON. The TCON divides the V-1line frame into two consecutive frames, where the odd-numbered frames present the mixed color of R and B, i.e., purple, and the even-numbered frames present the single color G, i.e., green. Moreover, for the odd-numbered frames, the TCON only generates the CLK on waveform corresponding to the odd rows, while keeping the CLK of the even rows off, and the data driver chip outputs data of R and B mixed color; for the even-numbered frames, the TCON only generates the CLK on waveform corresponding to the even rows, while keeping the CLK of the odd rows off, and the data driver chip outputs data of the single color G. Pixels corresponding to the CLK off will not be written with data voltage and keep dark, while pixels corresponding to the CLK on will be written with data and present bright. With this drive method, the data voltage output from the data driver chip remains unchanged during display of each frame, so the power consumption is low, the chip temperature can be reduced and the problem of vertical stripes in the display can be avoided. As the two frames are displayed alternately rapidly, due to persistence of vision of the human eye, the human eye observes the superimposed effect of the two frames, i.e., the V-1line screen, and the display effect is normal.

For example, the preset type includes a third type, pixel data of a first part of pixels and pixel data of a second part of pixels of an image of the third type correspond to a fifth grayscale range and a sixth grayscale range, respectively, the first part of pixels and the second part of pixels are alternately arranged in a row direction as well as in a column direction, and the fifth grayscale range is different from the sixth grayscale range.

For example, the third type is, for example, the 1V1H type, such that, for example, in the odd-numbered rows of pixels, the odd-numbered pixels (i.e., 1sth, 3rd, 5th and 7th pixels) are of a grayscale of 255 (presenting white) and the even-numbered pixels (i.e., 2nd, 4th, 6th and 8th sub-pixels) are of a grayscale of 0 (presenting black); in the even-numbered rows, the even-numbered pixels are of a grayscale of 255 (presenting white) and the odd-numbered pixels are of a grayscale of 0 (presenting black), so that the white pixels and the black pixels are arranged alternately in the row direction and the white pixels and the black pixels are also arranged alternately in the column direction, resulting in a checkerboard screen. The embodiment of the present disclosure is described using the above-described 1V1H screen as an example, but the present disclosure is not limited thereto. For example, in some other embodiments, it is also possible to make the odd-numbered pixels to have a grayscale of 0 and the even-numbered pixels to have a grayscale of 255, in the odd-numbered rows of pixels, as well as to make the odd-numbered pixels to have a grayscale of 255 and the even-numbered pixels to have a grayscale of 0, in the even-numbered rows of pixels.

For example, the fifth grayscale range is, for example, a grayscale range with a higher brightness, such as 235 to 255. The sixth grayscale range is, for example, a grayscale range with a lower brightness, such as 0 to 20. The embodiment of the present disclosure is illustrated as an example with the fifth grayscale range being 255, and the sixth grayscale range being 0.

Figure 11:
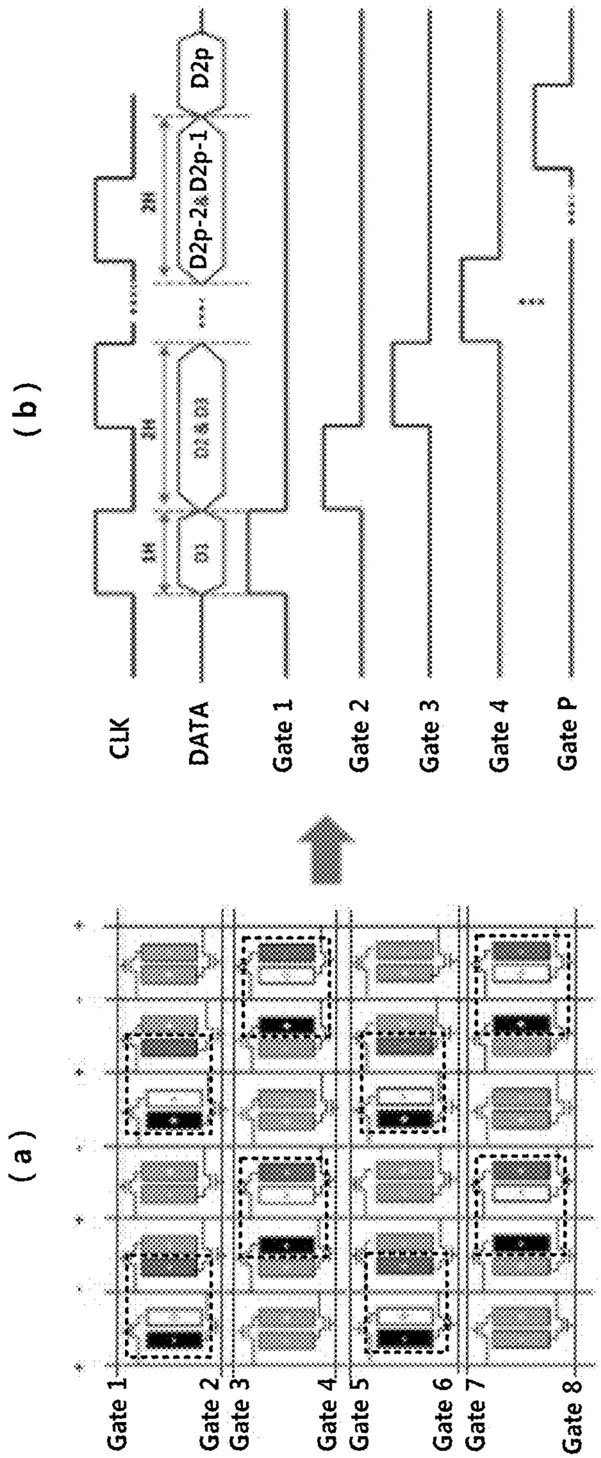
FIG. 11 is a schematic diagram of gate scanning signal drive timing and data signals that correspond to a 1V1H screen.

FIG. 11 is a schematic diagram of gate scanning signal drive timing and data signals that correspond to a 1V1H screen. As shown in part (a) of FIG. 11, the odd-numbered pixels in the first row of pixels such as the pixels in the 1st, 3rd, 5th positions are of a grayscale of 255, where each pixel contains three sub-pixels of the highest brightness; and the even-numbered pixels in the first row of pixels such as the pixels in the 2nd, 4th, and 6th are of a grayscale of 0, where each pixel contains three sub-pixels of the lowest brightness. If every three adjacent sub-pixels in a row are in a group, the brightness of the group of the sub-pixels in the second row is opposite to that of the group of the sub-pixels in the first row, and the brightness of the group of sub-pixels in a third row is opposite to that of the group of the sub-pixels in the second row (i.e., the same as the first row), and so on. The sub-pixels in the dashed box in part (a) of FIG. 11 are all of the highest brightness (corresponding to a grayscale of 255), and the sub-pixels outside the dashed box are all of the lowest brightness (corresponding to a grayscale of 0).

For this 1V1H screen, if the conventional drive method is adopted, the drive timing is shown in part (b) of FIG. 11, the data signal line undergoes frequent periodic jumps, and the data signal line has a jump once for every duration of 2H, the jump cycle is 4H, the jump frequency is high, and the power consumption and temperature of the data driver chip are high. The display apparatus of embodiments of the present disclosure can solve this problem. The following describes the processing of the V-1V1H screen by the display apparatus according to an embodiment of the present disclosure.

For example, when the to-be-displayed image frame is of the third type, the at least one target image frame includes a fourth image frame and a fifth image frame that are consecutive. Herein, pixel data of the first type of sub-pixels and pixel data of the third type of sub-pixels in the fourth image frame correspond to the one with a greater brightness of the fifth grayscale range and the sixth grayscale range, pixel data of the second type of sub-pixels in the fourth image frame corresponds to the one with a smaller brightness of the fifth grayscale range and the sixth grayscale range. Pixel data of the second type of sub-pixels in the fifth image frame corresponds to the one with a greater brightness of the fifth grayscale range and the sixth grayscale range, and pixel data of the first type of sub-pixels and pixel data of the third type of sub-pixels in the fifth image frame correspond to the one with a smaller brightness of the fifth grayscale range and the sixth grayscale range.

Figure 12:
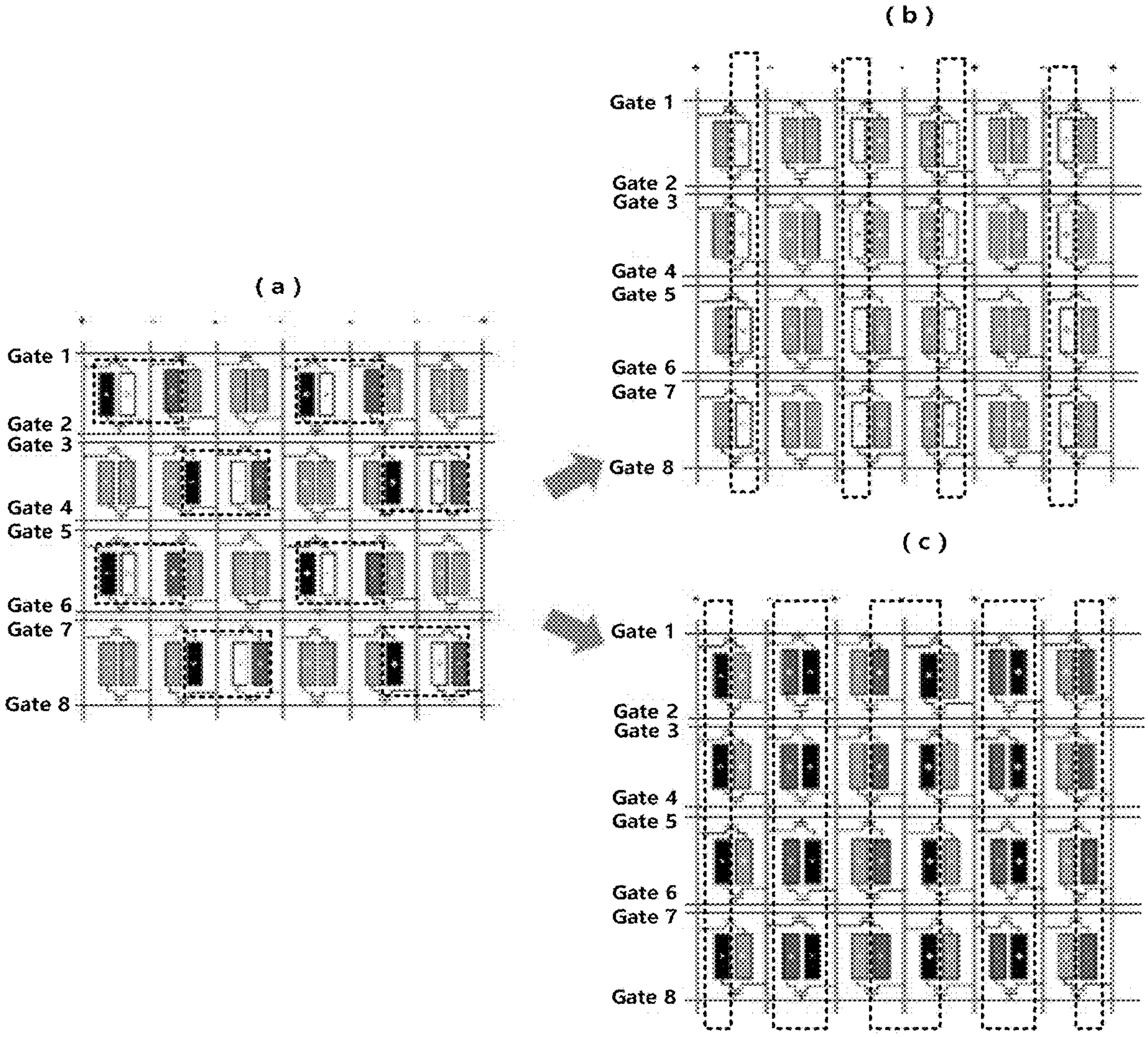
FIG. 12 is a schematic diagram of an image data conversion for the 1V1H screen according to at least one embodiment of the present disclosure.

FIG. 12 is a schematic diagram of an image data conversion for the 1V1H screen according to at least one embodiment of the present disclosure. For example, the 1V1H image frame shown in part (a) of FIG. 12 may be converted into a fourth image frame and a fifth image frame illustrated in part (b) and part (c) of FIG. 12, respectively, the fourth image frame and the fifth image frame are consecutive frames. In the fourth image frame, all of the sub-pixels G are of a grayscale of 255, and all of the sub-pixels R and the sub-pixels B are, for example, of a grayscale of 0, and thus, during the output of the fourth image frame, the data signal lines connected to the sub-pixels R and the sub-pixels B are always maintained at a low level, and the data signal lines connected to the sub-pixels G are always maintained at a high level. In the fifth image frame, all of the sub-pixels R and sub-pixels B are, for example, of a grayscale of 255 with higher brightness, and all of the sub-pixels G are, for example, of a grayscale of 0 with lower brightness, and thus, during the output of the fifth image frame, the data signal lines connected to the sub-pixels R and the sub-pixels B are always maintained at a high level, and the data signal lines connected to the sub-pixels G are always maintained at a low level.

For example, when the target image frame refers to the fourth image frame, the part of gate scanning signal lines include a third part of gate scanning signal lines. When the target image frame refers to the fifth image frame, the part of gate scanning signal lines include a fourth part of gate scanning signal lines. Herein, the third part of gate scanning signal lines include multiple first gate scanning signal lines connected to multiple odd-numbered rows of sub-pixels and multiple second gate scanning signal lines connected to multiple even-numbered rows of sub-pixels, respectively, and the fourth part of gate scanning signal lines include multiple first gate scanning signal lines connected to multiple even-numbered rows of sub-pixels and multiple second gate scanning signal lines connected to multiple odd-numbered rows of sub-pixels, respectively.

Figure 13:
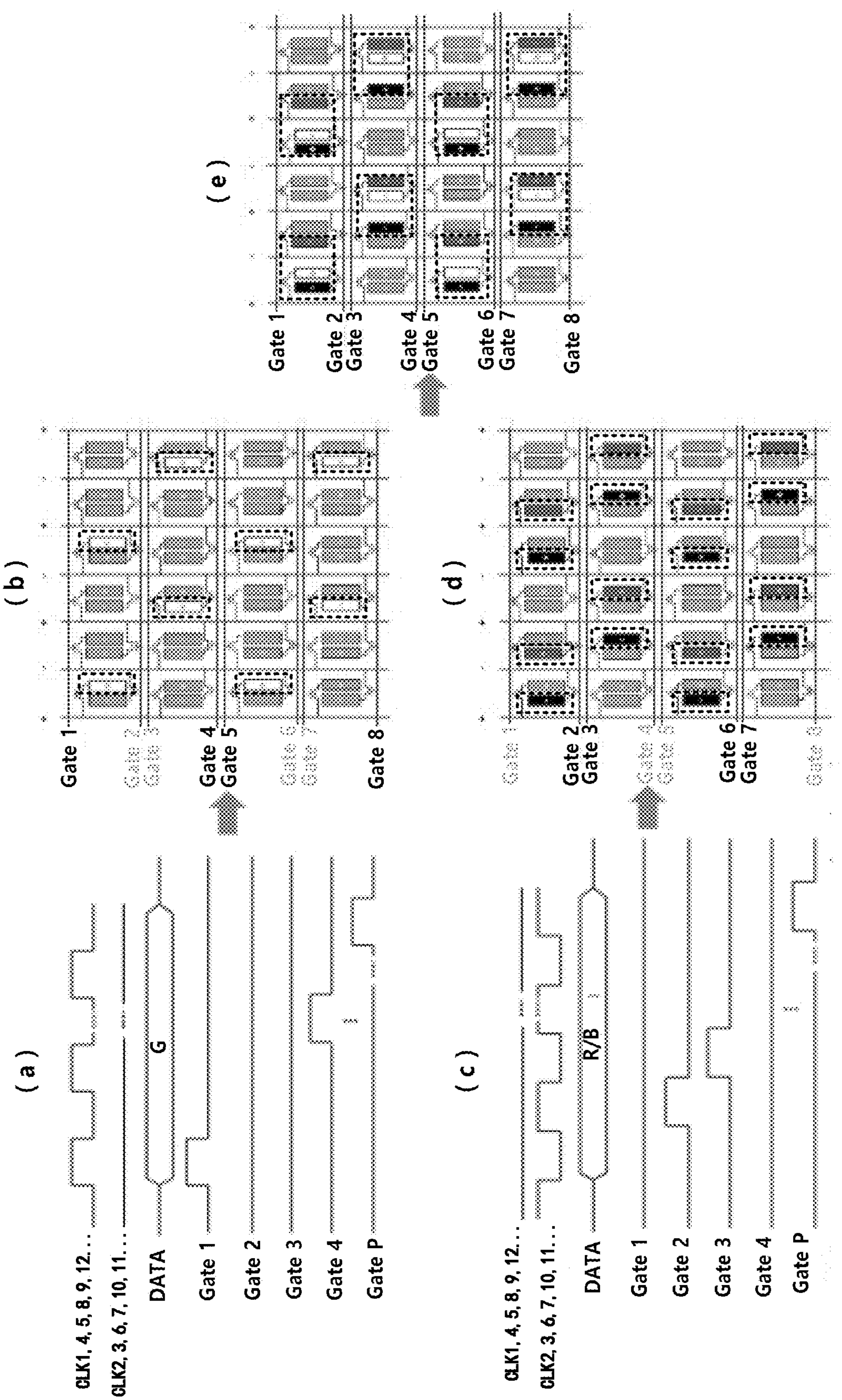
FIG. 13 is a schematic diagram of gate scanning signal drive timing for the 1V1H screen according to at least one embodiment of the present disclosure.

FIG. 13 is a schematic diagram of gate scanning signal drive timing for the 1V1H screen according to at least one embodiment of the present disclosure. For example, the set of clock signals corresponding to the fourth image frame shown in part (b) of FIG. 12 is referred to in part (a) of FIG. 13. If the first gate scanning signal line is a gate scanning signal line connected to the even-numbered sub-pixels in each row, as shown in FIG. 12, the first gate scanning signal line is a gate scanning signal line in the odd-numbered row such as the 1st, 3rd, 5th, 7th row and the like. If the second gate scanning signal line is a gate scanning signal line connected to the odd-numbered sub-pixels in each row, as shown in FIG. 12, the second gate scanning signal line is a gate scanning signal line in the even-numbered row such as the 2nd, 4th, 6th, 8th row, and the like. Therefore, for the fourth image frame, clock signals corresponding to multiple first gate scanning signal lines (Gate 1, Gate 5, Gate 9, etc.) connected to multiple odd-numbered rows of sub-pixels (sub-pixel rows such as rows 1, 3, and 5) and multiple second gate scanning signal lines (Gate 4, Gate 8, Gate 12, etc.) connected to multiple even-numbered rows of sub-pixels (sub-pixel rows such as rows 2, 4, 6) may be turned on, and the remaining clock signals may be turned off, so that the gate drive unit may generate corresponding gate drive signals according to this set of clock signals, the gate scanning signal lines of Gate 1, Gate 4, Gate 5, Gate 8, Gate 9, Gate 12, etc., sequentially shift to output gate scanning signals, and the remaining gate scanning signals do not output the gate scanning signals. On the basis of this approach, some of the sub-pixels G in the fourth image frame have the highest brightness, and the screen shown in part (b) of FIG. 13 is output (the sub-pixels in the dashed box are of a grayscale of 255 and the remaining sub-pixels are of a grayscale of 0).

For example, the set of clock signals corresponding to the fifth image frame shown in part (c) of FIG. 12 is referred to the part (c) of FIG. 13. For the fifth image frame, the clock signals corresponding to multiple first gate scanning signal lines (Gate 3, Gate 7, Gate 11, etc.) connected to multiple even-numbered rows of sub-pixels and multiple second gate scanning signal lines (Gate 2, Gate 6, Gate 10, etc.) connected to multiple even-numbered rows of sub-pixels, respectively, may be turned on, and the remaining clock signals may be turned off, so that the gate drive unit can generate corresponding gate drive signals according to this set of clock signals, the gate scanning signal lines such as Gate 2, Gate 3, Gate 6, Gate 7, Gate 10, Gate 11, etc.

sequentially shift to output gate scanning signals, and the remaining gate scanning signals do not output gate scanning signals. The on and off states of each gate scanning signal line in the fifth image frame are opposite to those in the fourth image frame. On the basis of this approach, some of the sub-pixels R and some of the sub-pixels B in the fifth image frame may have the highest brightness, and the screen shown in part (d) of FIG. 13 is output (the sub-pixels in the dashed box are of a grayscale of 255, and the remaining sub-pixels are of a grayscale of 0).

For example, the screen shown in part (b) of FIG. 13 and the screen shown in part (d) are output consecutively within a short period of time, and according to persistence of vision of the human eye, the effect of superimposing these two screens can be presented visually, and the superimposed screen is shown in part (e) of FIG. 13. The screen in this part (e) is consistent with the 1V1H screen shown in part (a) of FIG. 12, and thus screen output of the to-be-displayed image frame is realized. Moreover, for each target image frame, sub-pixels of the same type correspond to the same grayscale or are within a certain grayscale range, and therefore, voltage variation of the data signal is substantially maintained when the gate drive unit sequentially shifts to output the gate scanning signals to the part of the gate scanning signal lines, for each of the target image frames.

According to the display apparatus of the embodiments of the present disclosure, during the output of the third type of image frame, the data voltage output by the data driver chip remains substantially unchanged during the output duration of one frame, i.e., the voltage jump cycle of the data signal line is greater than the display duration of a frame. Therefore, compared with the conventional method, the display apparatus of the embodiments of the present disclosure has the advantages of extending the jump cycle of the data signal line substantially, reducing power consumption substantially, and being capable of lowering temperature of the chip and avoiding vertical stripes, on the basis of the normal output of the third type of image frame.

For example, in the embodiment of the present disclosure, the TCON (timing controller) is used to pre-analyze the to-be-displayed screen, and when it is detected that the to-be-displayed screen is a 1V1H screen, then the drive method is adjusted by means of the TCON. The TCON divides the 1V1H frame into two consecutive frames, where the odd-numbered frames present the single color G, i.e., green, and the even-numbered frames present the mixed color of R and B, i.e., purple. Moreover, for the odd-numbered frames, the TCON only generates the CLK on waveform corresponding to the rows 1, 4, 5, 8, 9, 12 . . . , while keeping the CLK in rows 2, 3, 6, 7, 10, 11, . . . off, and the data driver chip outputs data of R and B mixed color; for the even-numbered frames, the TCON only generates the CLK on waveform corresponding to even rows 2, 3, 6, 7, 10 and 11, while keeping the CLK in rows 1, 4, 5, 8, 9, 12, . . . off, and the data driver chip outputs data of the single color G. Pixels corresponding to the CLK off will not be written with data voltage and keep dark, while pixels corresponding to the CLK on will be written with data and present bright. As the two frames are displayed alternately rapidly, due to persistence of vision of the human eye, the human eye observes the superposition of the two frames, i.e., the normal V-1V1H screen. Similarly, with this drive method, the data voltage outputs from the data driver chip remains unchanged during display of each frame, so the power consumption is low, the chip temperature can be reduced and the problem of vertical stripes in the display can be avoided.

For example, the timing controller is configured to sequentially transmit the pixel data corresponding to the at least one target image frame to the data drive unit depending on the to-be-displayed image frame being an image of a preset type. For example, the timing controller may perform the image conversion operation and send pixel data of the target image frame obtained by the conversion to the data drive unit. For example, the operation of converting the image frame from part (a) to part (b) in FIG. 7 may be performed by the timing controller, the operation of converting the image frame from part (a) to part (b) and part (c) in FIG. 9 may be performed by the timing controller, and the operation of converting the image frame from part (a) to part (b) and part (c) in FIG. 12 may be performed by the timing controller.

For example, in other embodiments, the timing controller may control other units to perform the image conversion operation, for example, it may control the data drive unit to perform the image conversion operation. The timing controller is configured to send an image conversion execution instruction to the data drive unit to trigger the data drive unit to transmit a corresponding data signal to perform the image conversion operation depending on the to-be-displayed image frame being an image of the preset type.

Figure 14:
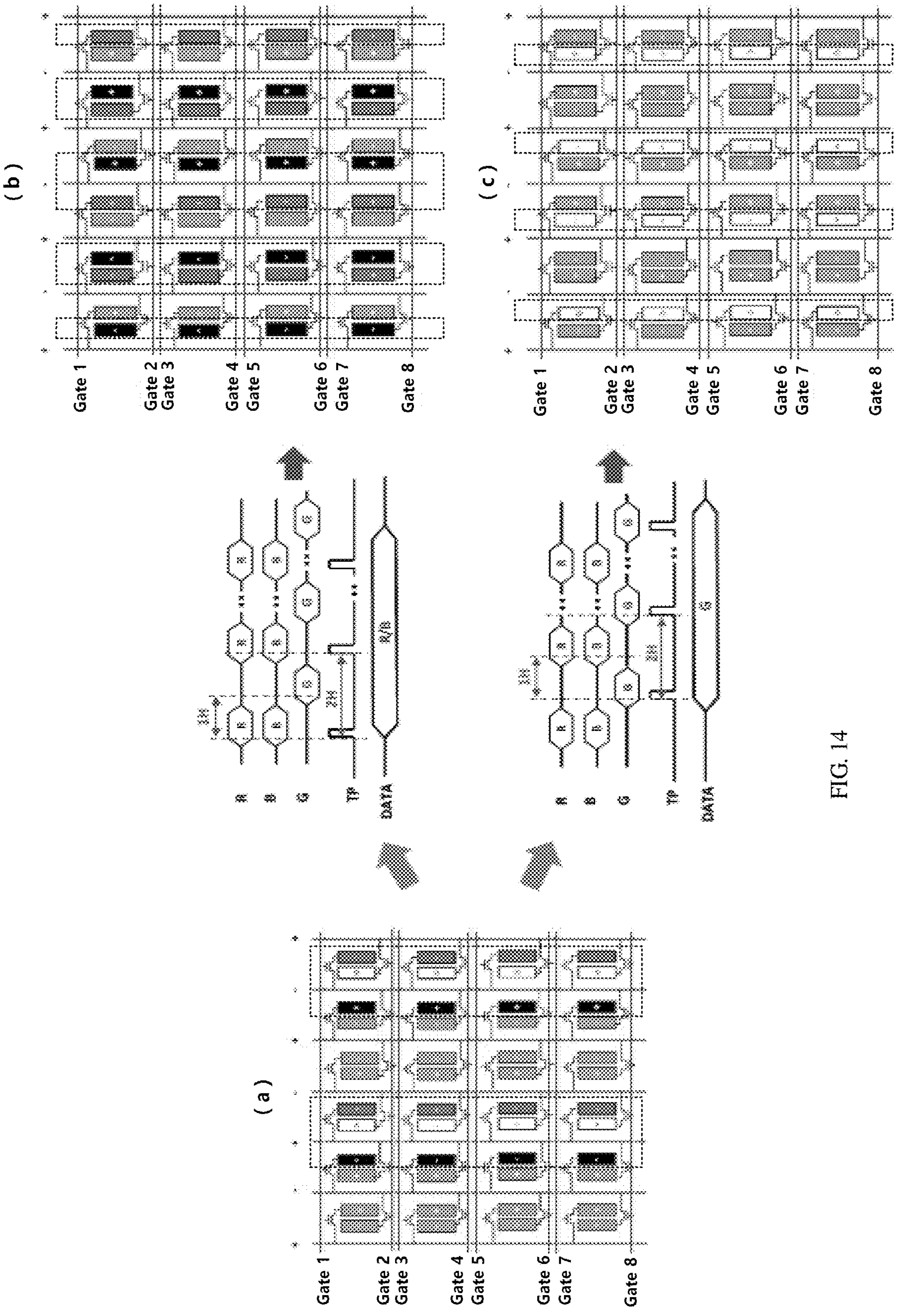
FIG. 14 is a schematic diagram of another image conversion for the V-1line screen according to at least one embodiment of the present disclosure.

FIG. 14 is a schematic diagram of another image conversion for the V-1line screen according to at least one embodiment of the present disclosure. As shown in FIG. 14, it is possible, for example, to keep the screen data output from the TCON to the data driver unit still as a V-1line screen (as shown in part (a) of FIG. 14), and to realize the screen conversion by adjusting an output control signal (TP signal) of the data driver chip, where the TP signal is used to control the signals output from the data driver unit to the multiple data signal lines. For example, the TP signal may be controlled so that the screen data output from the data driver unit is converted to R/B mixed color for odd-numbered frames and single color G for even-numbered frames. As shown in FIG. 14, when the TP signal is of a high level, the data driver chip outputs the data corresponding to the TP signal to a pixel region data line, and when the TP signal is of a low level, the output data remains constant. When outputting the even number of frames (e.g., a second image frame), a high level of the signal TP is controlled to correspond to a high level of the R/B data, such that the second image frame shown in part (b) is output; when outputting the odd number of frames (e.g., a third image frame), a high level of the control signal TP is controlled to correspond to a high level of the G data, such that the third image frame shown in part (c) is output. The TP signal has a cycle of 2H, and accordingly the data driver chip outputs the target image frame. It is to be noted that FIG. 14 illustrates that the output data signal is triggered when the TP signal is of a high level, but of course, the output data signal may also be triggered when the TP signal is of a low level, i.e., a jump of the TP signal can be used as a trigger for outputting the data signal, which may be implemented in other embodiments and not limited thereto.

Figure 15:
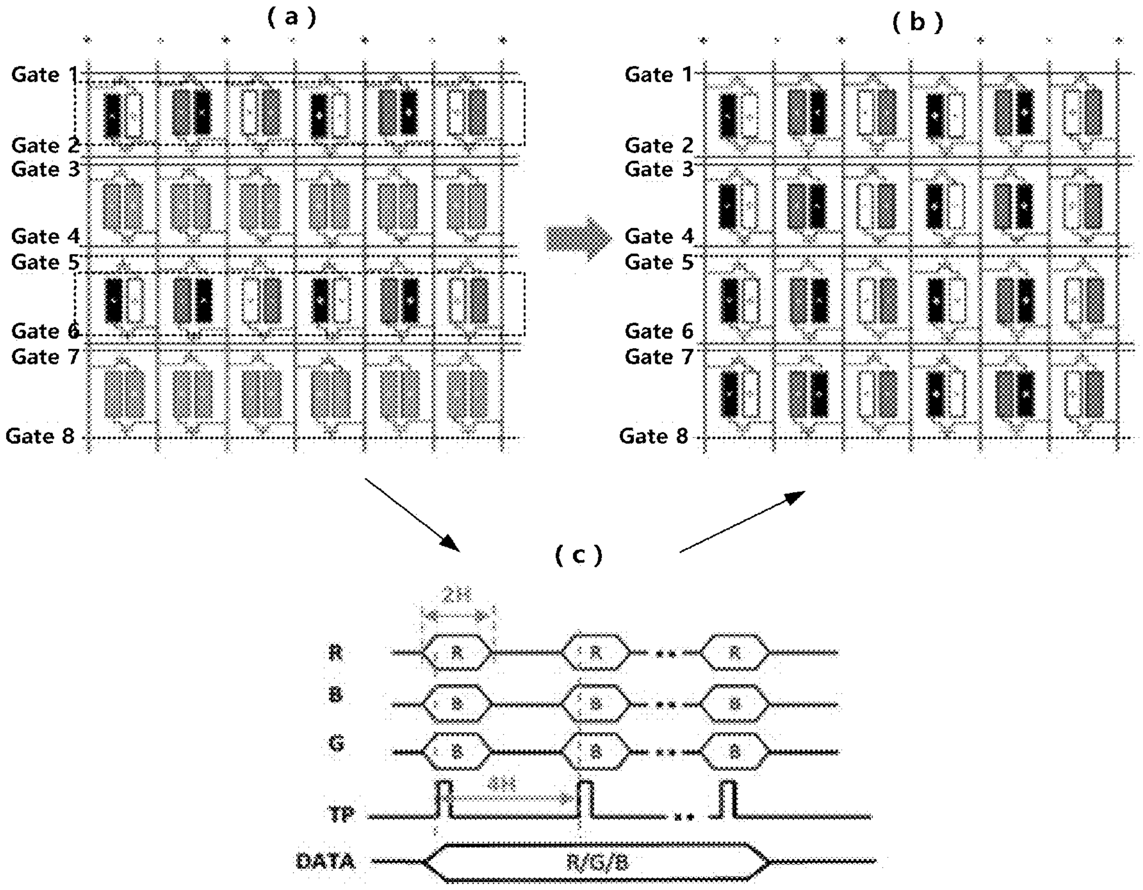
FIG. 15 is a schematic diagram of another image conversion for an H-1line screen according to at least one embodiment of the present disclosure.

FIG. 15 is a schematic diagram of another image conversion for an H-1line screen according to at least one embodiment of the present disclosure. As shown in FIG. 15, similarly, it is possible to keep the screen data output from the TCON to the data driver unit still as an H-1line screen (as shown in part (a) of FIG. 15), and to realize the screen conversion by adjusting an output control signal (TP signal) of the data driver chip. For example, as shown in part (c) of FIG. 15, the data output from the data driver unit can be realized as an all-white screen (as shown in part (b) of FIG.

15) since the TP signal has a high level corresponding to the high level of R/G/B, and the TP cycle is 4H.

For example, the conversion of the 1V1H screen by the data driver unit may be referred to FIG. 14 and its related descriptions.

For example, by controlling the output signal of the data driver unit to realize the conversion of the image data, the efficiency of the image conversion can be improved and the computation amount of the timing controller can be reduced.

Figure 16:
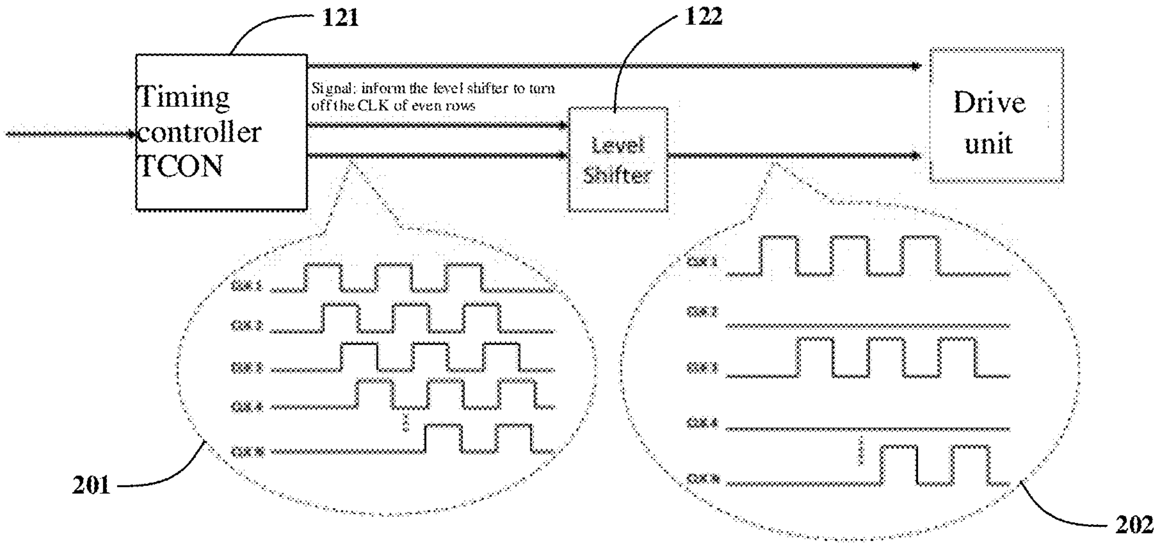
FIG. 16 is a schematic diagram of a timing conversion according to at least one embodiment of the present disclosure.

FIG. 16 is a schematic diagram of a timing conversion according to at least one embodiment of the present disclosure. As shown in FIG. 16, for example, the control unit includes a timing controller 121 and a level shifter (denoted by Level Shifter in the figure) 122. The timing controller 121 is configured to receive the pixel data of the to-be-displayed image frame, and to generate multiple initial clock signals 201 on the basis of the pixel data of the to-be-displayed image frame, depending on the to-be-displayed image frame being an image of the preset type; and the level shifter is configured to receive the initial clock signals from the timing controller, and perform the clock conversion operation in response to receiving the initial clock signals to obtain at least a set of clock signals 202. The drive unit in FIG. 16 includes a gate drive unit and a data drive unit.

For example, the embodiments of the present disclosure may implement the clock conversion operation by the level shifter. The TCON (timing controller) normally outputs all CLK (clock) signals, and the signals are transferred to the level shifter for voltage modulation, and the TCON may send a signal to notify the level shifter of the CLK that needs to be kept off (e.g., to inform the level shifter to turn off the CLK of even rows), and then the level shifter performs voltage modulation on the CLK that are normally turned on, while pulling down all the CLK that needs to be turned off to a low level. The clock conversion operation is performed by the level shifter different from the timing controller, the efficiency of clock conversion can be improved and the computation amount of the timing controller can be reduced.

Figure 17:
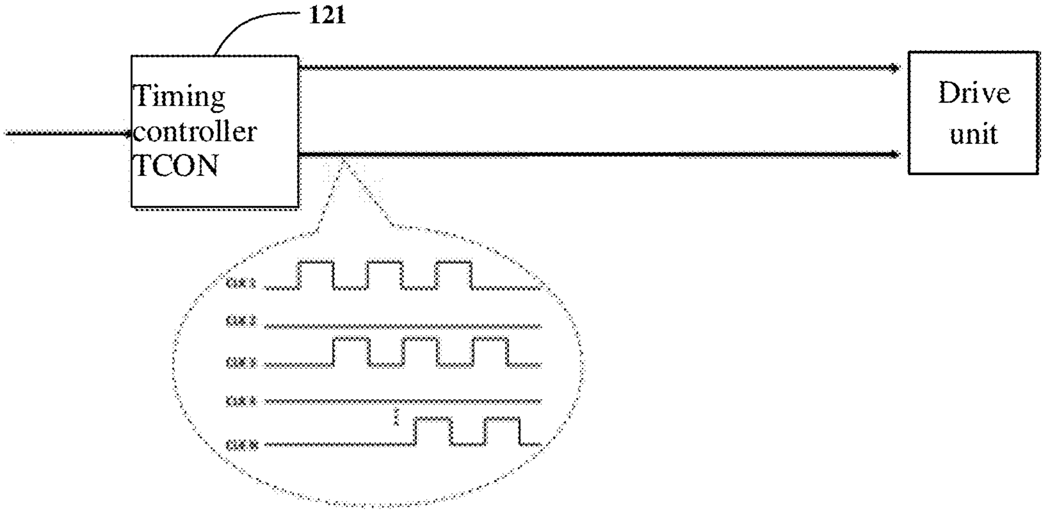
FIG. 17 is a schematic diagram of another timing conversion according to at least one embodiment of the present disclosure.

FIG. 17 is a schematic diagram of another timing conversion according to at least one embodiment of the present disclosure. As shown in FIG. 17, in some embodiments, the clock conversion operation may also be performed within a TCON, and the TCON directly outputs the adjusted clock signal.

Figure 18:
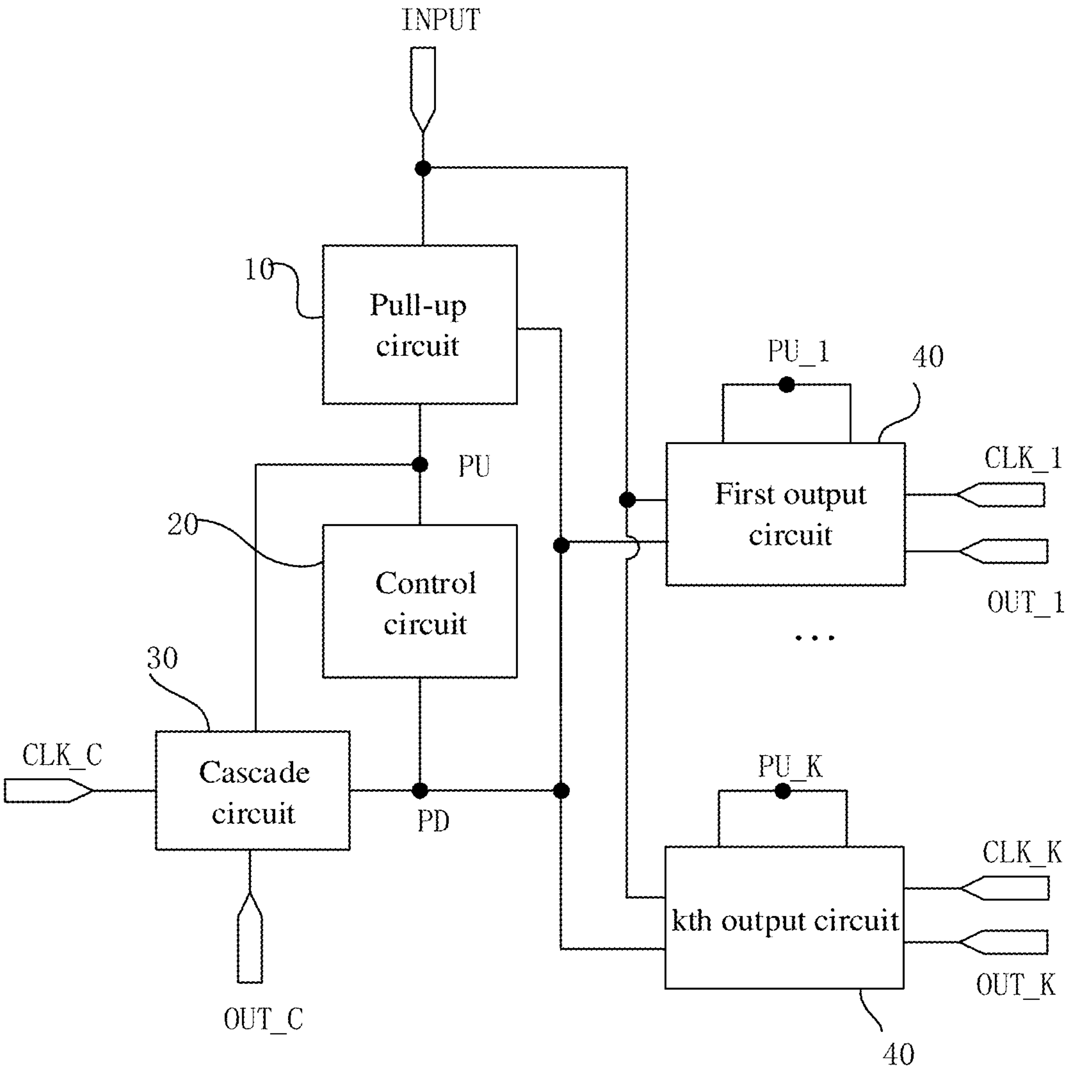
FIG. 18 is a schematic diagram of a shift register according to at least one embodiment of the present disclosure.

For example, the gate drive unit includes multiple cascaded shift registers. FIG. 18 is a schematic diagram of a shift register according to at least one embodiment of the present disclosure. As shown in FIG. 18, each shift register includes a pull-up circuit 10 (i.e., a first circuit), a control circuit 20, a cascade circuit 30, and N output circuits 40.

The pull-up circuit 10 is connected to an input signal end INPUT, a total pull-up node (i.e., the first node) PU, and a pull-down node (i.e., the second node) PD of the shift register. The pull-up circuit 10 is configured to provide a signal from the input signal end INPUT to the total pull-up node PU and to pull down a potential of the total pull-up node PU under the control of a potential of the pull-down node PD.

The control circuit 20 is connected to the total pull-up node PU and the pull-down node PD, and the control circuit 20 is configured to control the potential of the pull-down node PD according to the potential of the total pull-up node PU.

The cascade circuit 30 is connected to the total pull-up node PU, the pull-down node PD, and a cascade output end OUT_C and a control clock signal end CLK_C of the shift register. The cascade circuit 30 is configured to provide a signal from the control clock signal end CLK_C to the cascade output end OUT_C under the control of the potential of the total pull-up node PU, and to pull-down a potential of the cascade output end OUT_C under the control of the potential of the pull-down node PD.

The k output circuits 40 are connected to the input signal end INPUT, the pull-down node PD, and k output clock signal ends (e.g., CLK_1 to CLK_K), k pull-up sub-nodes (i.e., the k sub-nodes, e.g., PU_1 to PU_K), and k output signal ends (e.g., OUT_1 to OUT_K) of the shift register, respectively. A kth output circuit 40 is connected to the input signal end INPUT, the pull-down node PD, a kth output signal end OUT_n, and a kth pull-up sub-node PU_k, and is configured to input a signal from the input signal end INPUT to the kth pull-up sub-node PU_k, provide a signal from the kth output clock signal end CLK_k to a kth output signal end OUT_k under the control of a potential of the kth pull-up sub-node PU_k, and pull down a potential of the kth output signal end OUT_k under the control of the potential of the pull-down node PD. Here, K is an integer greater than 1, k is an integer and $1 \le k \le K$. In some embodiments, $2 \le K \le 8$, for example, K may be 2, 3, 4, 5, or 6.

According to the embodiments of the present disclosure, with the structure in which K output circuits share a control circuit in the shift register, the shift register can substitute conventional multiple shift registers to independently generate multiple output signals, and have a simpler circuit structure as compared to a combination of multiple shift registers in the conventional art. For example, in the shift register, the K output circuits share a common control circuit, i.e., are controlled by the potential of the same pull-down node PD. Each output circuit contains a respective pull-up sub-node capable of generating outputs independently of each other.

Figure 19A:
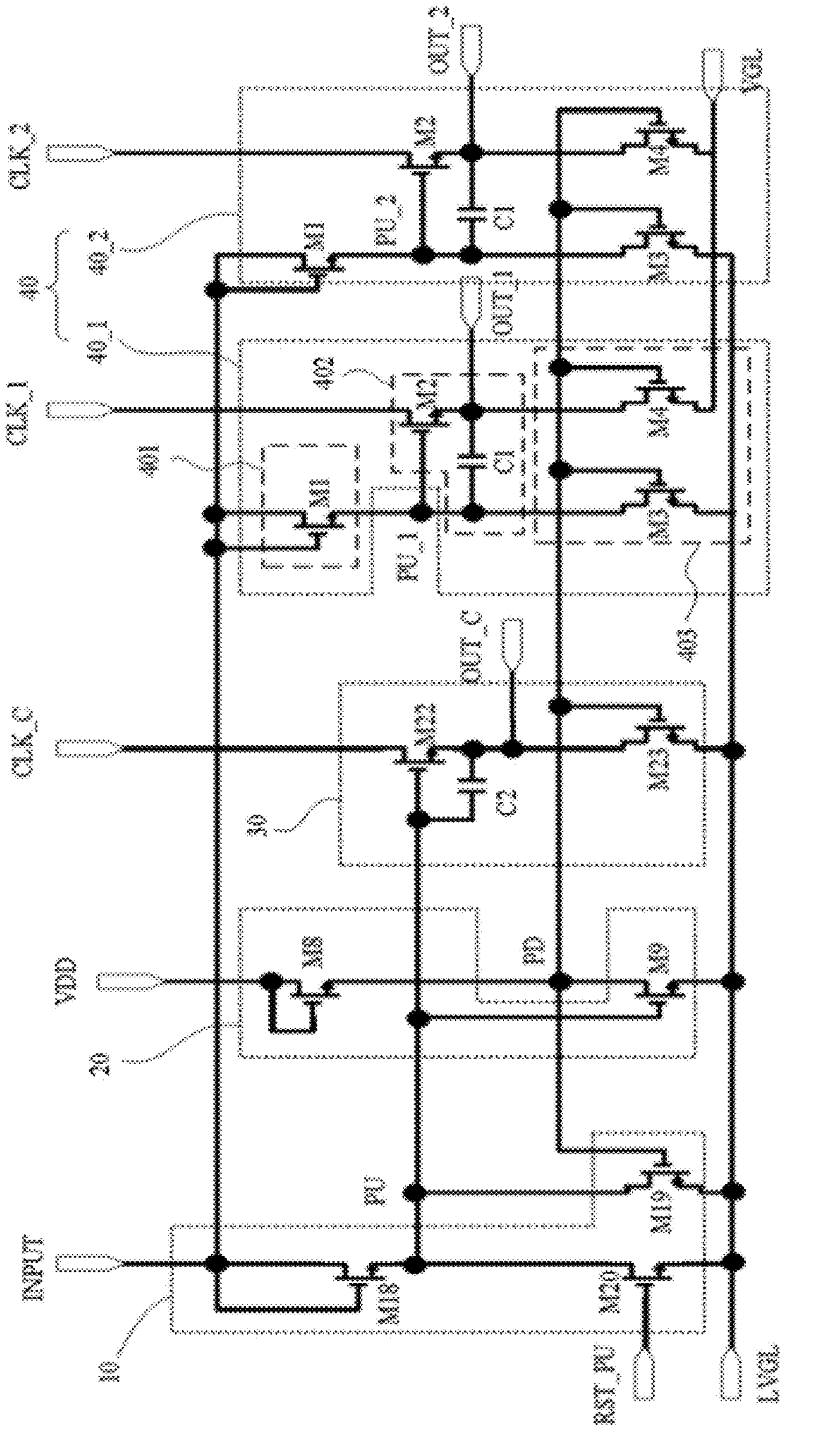
FIG. 19A is a circuit diagram of a shift register according to at least one embodiment of the present disclosure.

FIG. 19A is a circuit diagram of a shift register according to at least one embodiment of the present disclosure.

As shown in FIG. 19A, the shift register includes a pull-up circuit 10, a control circuit 20, a cascade circuit 30, and K output circuits. In an embodiment of the present disclosure, K is greater than or equal to 2, i.e., each shift register may be provided with two or more output circuits. In the example shown in FIG. 19A, it is illustrated as an example that the shift register includes two output circuits, but the present disclosure is not limited thereto, and the number of output circuits may be determined according to needs, e.g., four or more may be provided.

As shown in FIG. 19A, the K output circuits include a first output circuit 40_1 and a second output circuit 40_2 (hereinafter collectively referred to as an output circuit 40). The first output circuit 40_1 and the second output circuit 40_2 share the control circuit 20. In this case, the shift register may include a first output clock signal end CLK_1 and a second output clock signal end CLK_2, a first output signal end OUT_1 and a second output signal end OUT_2, a first pull-up node PU_1 and a second pull-up node PU_2.

Referring to FIG. 19A, each output circuit 40 includes an input sub-circuit 401, an output sub-circuit 402, and a pull-down sub-circuit 403. The structure of the output sub-circuit is described below taking any one of the output sub-circuits 40 (i.e., the kth output sub-circuit 40, k=1 or 2) as an example.

The input sub-circuit 401 is connected to the input signal end INPUT and the kth pull-up sub-node PU_k, and is configured to provide a signal from the input signal end INPUT to the kth pull-up sub-node PU_k.

The output sub-circuit 402 is connected to the kth pull-up sub-node PU_k, the kth output clock signal end CLK_k, and the kth output signal end OUT_k, and is configured to provide a signal from the kth output clock signal end CLK_k to the kth output signal end OUT_k under the control of the potential of the kth pull-up sub-node PU_k.

The pull-down sub-circuit (i.e., the second sub-circuit) 403 is connected to the pull-down node PD and is configured to pull down the potentials of the kth pull-up sub-node PU_k and the kth output signal end OUT_k under the control of the potential of the pull-down node PD.

As shown in FIG. 19A, in the first output circuit 40_1, the input sub-circuit 401 may include a first transistor M1. A gate electrode of the first transistor M1 and a first electrode of the first transistor M1 are connected to the input signal end INPUT, and a second electrode of the first transistor M1 is connected to the first pull-up sub-node PU_1.

In the first output circuit 40_1, the output sub-circuit 402 may include a second transistor M2 and a first capacitor C1. A gate electrode of the second transistor M2 is connected to the first pull-up sub-node PU_1, a first electrode of the second transistor M2 is connected to the first output clock signal end CLK_1, and a second electrode of the second transistor M2 is connected to the first output signal end OUT_1. A first end of the first capacitor C1 is connected to the first pull-up sub-node PU_1, and a second end of the first capacitor C1 is connected to the first output signal end OUT_1.

In the first output circuit 40_1, the pull-down sub-circuit 403 may include a third transistor M3 and a fourth transistor M4. A gate electrode of the third transistor M3 is connected to the pull-down node PD, a first electrode of the third transistor M3 is connected to a reference signal end (e.g., a first reference signal end LVGL) of the shift register, and a second electrode of the third transistor M3 is connected to the first pull-up sub-node PU_1. A gate electrode of the fourth transistor M4 is connected to the pull-down node PD, a first electrode of the fourth transistor M4 is connected to a reference signal end (e.g., a second reference signal end VGL) of the shift register, and a second electrode of the fourth transistor M4 is connected to the first output signal end OUT_1.

The second output circuit 40_2 has a structure similar to that of the second output circuit 40_1, with the difference that it is connected to the second pull-up sub-node PU_2, the second output clock signal end CLK_2, and the second output signal end OUT_2. As shown in FIG. 19A, in the second output circuit 40_2, the gate electrode of the first transistor M1 and the first electrode of the first transistor M1 are connected to the input signal end INPUT, and the second electrode of the first transistor M1 is connected to the second pull-up sub-node PU_2. The gate electrode of the second transistor M2 is connected to the second pull-up sub-node PU_2, the first electrode of the second transistor M2 is connected to the second output clock signal end CLK_2, and the second electrode of the second transistor M2 is connected to the second output signal end OUT_2. The first end of the first capacitor C1 is connected to the second pull-up sub-node PU_2, and the second end of the first capacitor C1 is connected to the second output signal end OUT_2. The gate electrode of the third transistor M3 is connected to the pull-down node PD, the first electrode of the third transistor M3 is connected to the first reference signal end LVGL, and the second electrode of the third transistor M3 is connected to the second pull-up sub-node PU_2. The gate electrode of the fourth transistor M4 is connected to the pull-down node PD, the first electrode of the fourth transistor M4 is connected to the second reference signal end VGL, and the second electrode of the fourth transistor M4 is connected to the second output signal end OUT_2. Optionally, the first reference signal end LVGL has a lower voltage than the second reference signal end VGL.

The control circuit 20 may include an eighth transistor M8 and a ninth transistor M9. A gate electrode of the eighth transistor M8 and its first electrode are connected to a power signal end VDD of the shift register, and a second electrode of the eighth transistor M8 is connected to the pull-down node PD. A gate electrode of the ninth transistor M9 is connected to the total pull-up node PU, a first electrode of the ninth transistor M9 is connected to the reference signal end (e.g., the first reference signal end LVGL) of the shift register, and a second electrode of the ninth transistor M9 is connected to the pull-down node PD.

The pull-up circuit 10 includes an eighteenth transistor M18, a nineteenth transistor M19, and a twentieth transistor M20. A gate electrode of the eighteenth transistor M18 and its first electrode are connected to an input signal end INPUT, and a second electrode of the eighteenth transistor M18 is connected to a total pull-up node PU. A gate electrode of the nineteenth transistor M19 is connected to a pull-down node, a first electrode of the nineteenth transistor M19 is connected to the reference signal end (e.g., the first reference signal end LVGL) of the shift register, and a second electrode of the nineteenth transistor M19 is connected to the total pull-up node PU. A gate electrode of the twentieth transistor M20 is connected to a reset signal end RST_PU of the shift register, a first electrode of the twentieth transistor M20 is connected to the reference signal end (e.g., the first reference signal end LVGL), and a second electrode of the twentieth transistor M20 is connected to the total pull-up node PU.

The cascade circuit 30 may include a twenty-second transistor M22, a twenty-third transistor M23, and a second capacitor C2. A gate electrode of the twenty-second transistor M22 is connected to the total pull-up node PU, a first electrode of the twenty-second transistor M22 is connected to the control clock signal end CLK_C, and a second electrode of the twenty-second transistor M22 is connected to the cascade output end OUT_C. A gate electrode of the twenty-third transistor M23 is connected to the pull-down node PD, a first electrode of the twenty-third transistor M23 is connected to the reference signal end (e.g., the first reference signal end LVGL) of the shift register, and a second electrode of the twenty-third transistor M23 is connected to the cascade output end OUT_C. A first end of the second capacitor C2 is connected to the gate electrode of the twenty-second transistor M22, and a second end of the second capacitor C2 is connected to the cascade output end OUT_C.

Figure 19B:
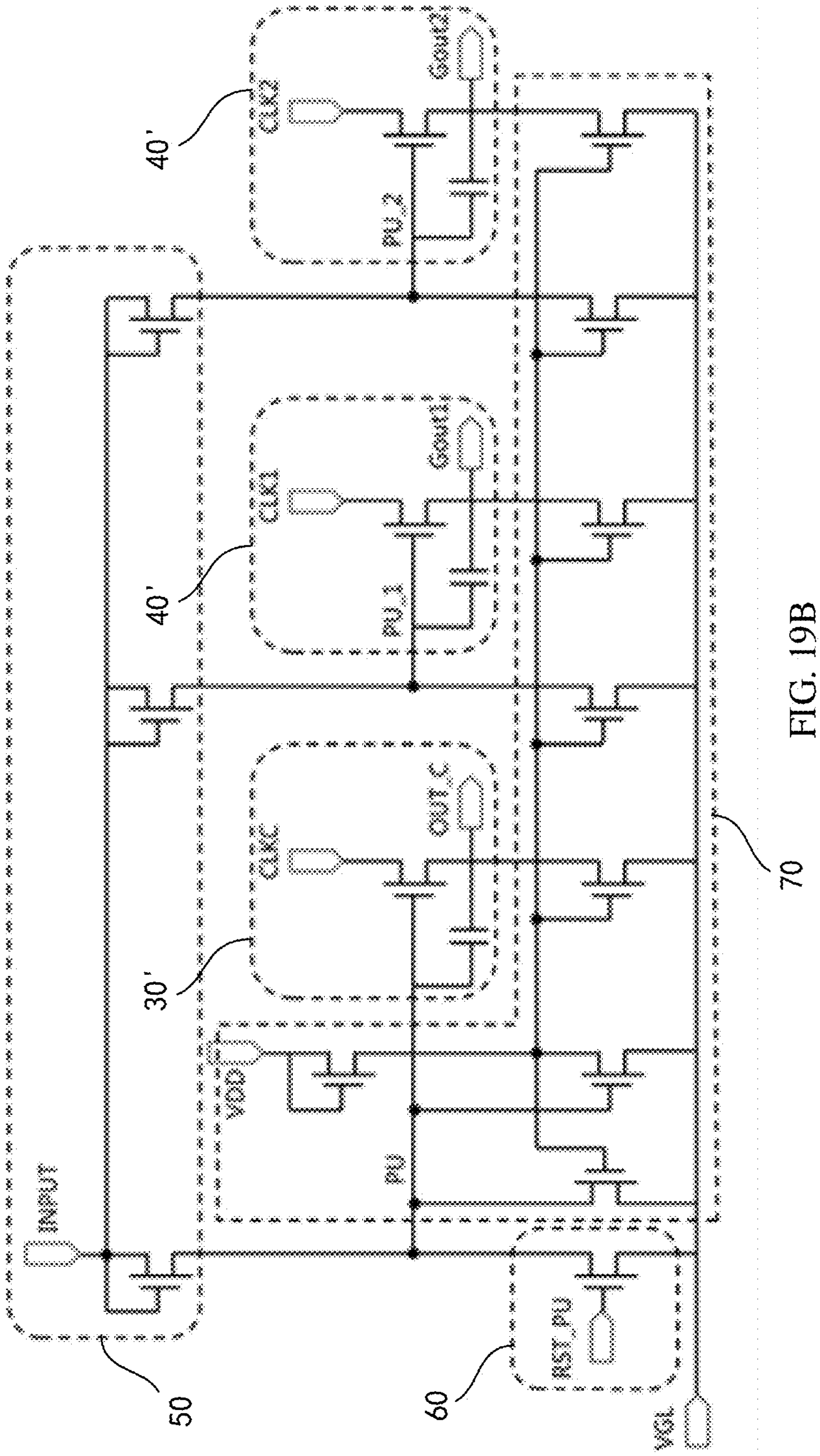
FIG. 19B is a circuit diagram of another shift register according to at least one embodiment of the present disclosure.

FIG. 19B is a circuit diagram of another shift register according to at least one embodiment of the present disclosure.

As shown in FIG. 19B, the shift register includes a cascade control output module 30', a gate signal output control module 40', a PU charging module 50, a PU discharge reset module 60, and a PD noise reduction module 70. Different clock signals are connected to input ends of the cascade control output module 30' and the gate signal output module 40'. The shift register may include two or more gate signal output control modules 40', such as three gate signal output control modules 40', four gate signal output control modules 40', and five gate signal output control modules 40', while the multiple gate signal output control modules 40' are connected to corresponding PD noise reduction modules 70.

For example, the cascade control output module 30' includes, for example, the twenty-second transistor M22 and the second capacitor C2 of the cascade circuit 30 shown in FIG. 19A. Each gate signal output control module 40' includes, for example, the output sub-circuit 402 of the output circuit 40 shown in FIG. 19A, i.e., including the second transistor M2 and the first capacitor C1. The PU charging module 50 includes, for example, the eighteenth transistor M18 and the first transistor M1 shown in FIG. 19A. The PU discharge reset module 60 includes, for example, the twentieth transistor M20 shown in FIG. 19A. The PD noise reduction module 70 includes, for example, the eighth transistor M8, the ninth transistor M9, the nineteenth transistor M19, the twenty-third transistor M23, the third transistor, and the fourth transistor shown in FIG. 19A. The functions and connection relationships of the components (transistors, capacitors, etc.) included in each module may refer to the above descriptions with respect to FIG. 19A and will not be repeated herein.

Figure 20:
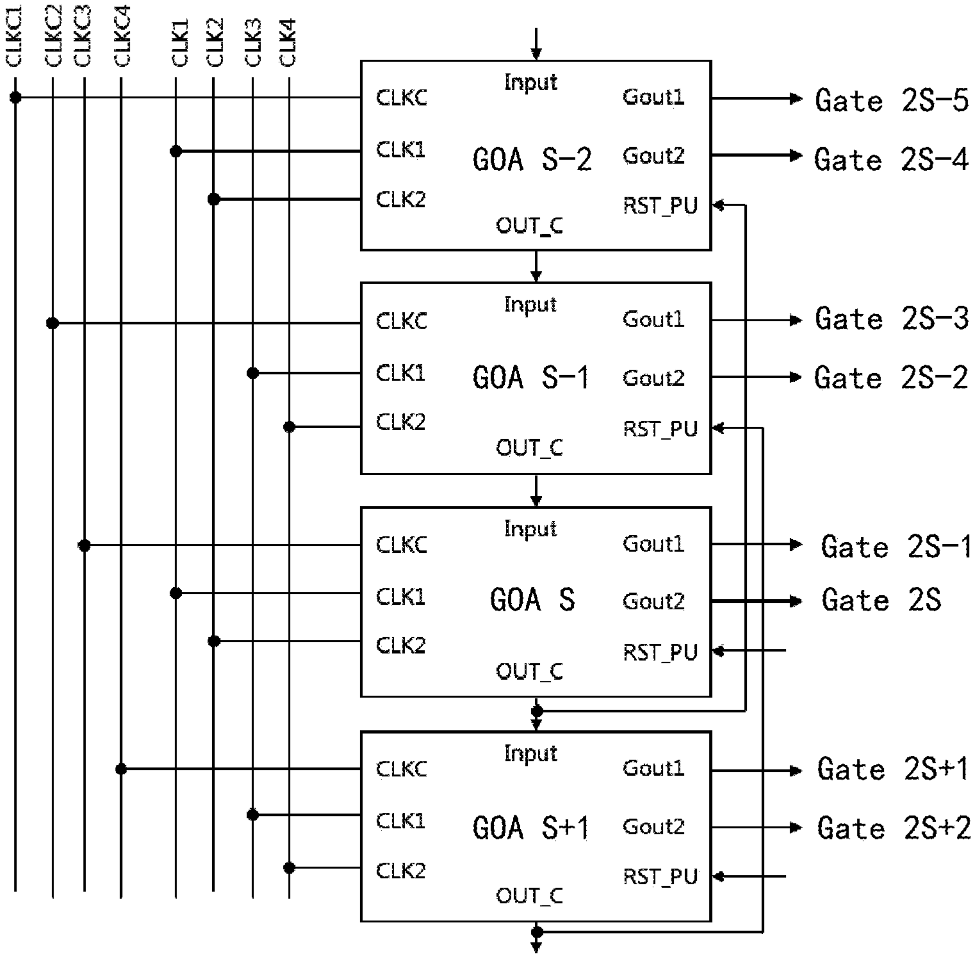
FIG. 20 is a schematic structural diagram of a gate driver circuit according to at least one embodiment of the present disclosure.

FIG. 20 is a schematic structural diagram of a gate driver circuit according to at least one embodiment of the present disclosure.

Referring to FIG. 20, the gate driver circuit includes multiple cascaded shift registers, and each of which may be implemented as a shift register of any of the above embodiments. For case of description, four shift registers are illustrated in FIG. 20, with GOA S−2, GOA S−1, GOA S, and GOA S+1 as examples, where S is an integer greater than 2. Four CLKCs (CLKC1-CLKC4) and four CLKs (CLK1 to CLK4) are used to be connected to the multiple shift registers. The cascade relationship of the shift registers is shown in FIG. 20. An input signal end INPUT of a shift register in each stage is connected to a cascade output end OUT_C of a shift register in the upper stage, herein, it may be connected to a shift register in the upper stage or the upper stage of at least one level apart, which is not limited thereto. The 4 stages of the shift registers GOA S−2, GOA S−1, GOA S, and GOA S+1 are connected to 4 clock signal lines. For example, a cascade control output signal OUT_C of a GOA unit in stage S is connected to an RST_PU port of the PU discharge reset module of a GOA unit in stage S−2 to control the PU reset of stage S−2, and it is also connected to an INPUT port of the PU charging module of a GOA unit of stage S+1 to control the GOA unit of stage S+1 to output cascade and gate-on signals. It is to be noted that the number of CLK and CLKC signal lines may be set according to the actual circuit cascade relationship, and is not limited here, for example, CLK and CLKC may be 6, 8, 10, 12, 14, etc. respectively.

Referring to FIG. 20, each shift register in the gate driver circuit has, for example, two output circuits, which can be implemented, for example, by the shift register described in FIG. 19A or FIG. 19B. Two output clock signal ends CLK_1 and CLK_2 of the shift register GOA S−2 are connected in one-to-one correspondence with the first clock signal line CLK1 and the second clock signal line CLK2. Two output clock signal ends CLK_1 and CLK_2 of the shift register GOA S−1 are connected in one-to-one correspondence with the third clock signal line CLK3 and the fourth clock signal line CLK4. Two output clock signal ends CLK_1 and CLK_2 of the shift register GOA S are connected to the first clock signal line CLK1 and the second clock signal line CLK2 in one-to-one correspondence, i.e., the same clock signal lines are connected to the shift register GOA S−2. Two output clock signal ends CLK_1 and CLK_2 of the shift register GOA S+1 are connected in one-to-one correspondence with the third clock signal line CLK3 and the fourth clock signal line CLK4, i.e., the same clock signal lines are connected to the shift register GOA S−1.

In operation, the shift register GOA S−2 outputs two output signals Gate 2S−5 and Gate 2S−4 at the two output signal ends Gout1 and Gout2, respectively, under the control of the clock signals on the clock signal lines CLK1 and CLK2, for example, and outputs a cascade signal at the cascade output end OUT_C to an input signal end INPUT of the shift register GOA S−1 in the next stage. The shift register GOA S−1 outputs two output signals Gate 2S−3 and Gate 2S−2 at the two output signal ends Gout1 and Gout2, respectively, according to the cascade signal at the input signal end INPUT under the control of the clock signal lines CLK3 and CLK4, and so on.

Figure 21A:
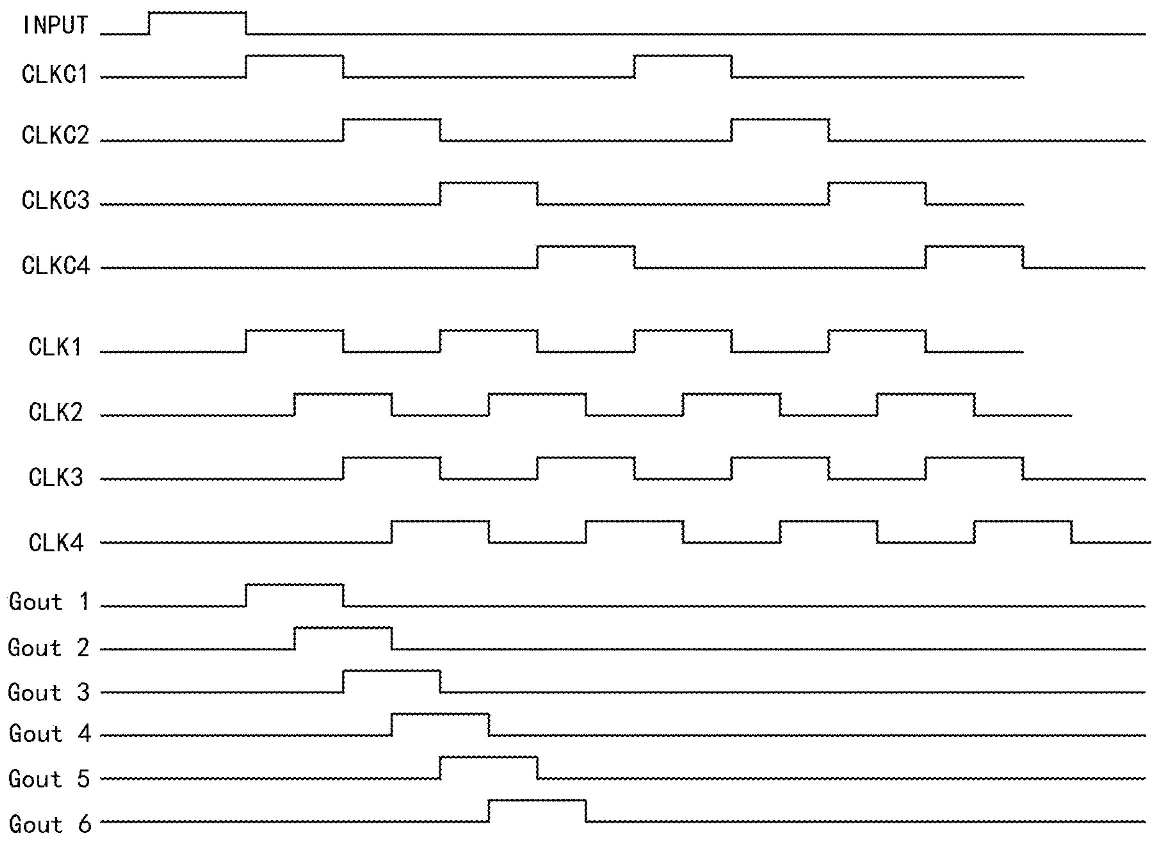
FIG. 21A is a signal timing diagram of a gate driver circuit in a global scanning mode according to at least one embodiment of the present disclosure.

FIG. 21A is a signal timing diagram of a gate driver circuit in a global scanning mode according to at least one embodiment of the present disclosure. As shown in FIG. 21A, the global scanning mode is, for example, a mode in which a gate scanning unit outputs gate scanning signals to all of the gate scanning signal lines connected thereto. The waveforms of CLKC1 to CLKC4 in the global scanning mode are, for example, half of the waveforms of CLK1 and CLK3, respectively. For example, referring to FIGS. 20 and 21A, four output clock signals shifted line by line sequentially are applied to the output clock signal lines CLK1 to CLK4 in the global scanning mode, so that multiple output signals shifted line by line sequentially are generated by a multi-stage shift register of the gate driver circuit, where two output circuits of the shift register in each stage generate output signals. Gout1 to Gout6 correspond to, for example, Gate 2S−5 to Gate 2S shown in FIG. 20, respectively. In some embodiments, the active level duty cycle of CLKC (including CLKC1 to CLKC4) and CLK (including CLK1 to CLK4) is equal to or less than ½.

For example, referring to FIGS. 20 and 21A, a control clock signal may be applied to the control clock signal lines CLKC1 to CLKC4, respectively, and four output clock signals sequential shifted may be applied to the output clock signal lines CLK1, CLK2, CLK3, and CLK4, respectively, such that two output circuits of the shift register in each stage can generate output signals.

For example, before scanning, the shift register GOA S−2 outputs two sequentially shifted output signals Gout1 and Gout2 at two output signal ends under the control of the clock signals on the output clock signal lines CLK1 and CLK2, respectively, and outputs a cascade signal at the cascade output end OUT_C under the control of the control clock signal on the control clock signal line CLKC1. The cascade signal is supplied to the input signal end INPUT of the shift register GOA S−1. On the basis of the cascade signal received at the input signal end INPUT, the shift register GOA S−1 outputs two sequential shifted output signals Gout3 and Gout4 at the two output signal ends under the control of the output clock signal lines CLK3 and CLK4, respectively, and outputs a cascade signal at the cascade output end OUT_C under the control of the control clock signal on the control clock signal line CLKC2. The cascade signal is supplied to the input signal end INPUT of the shift register GOA S. On the basis of the cascade signal received at the input signal end INPUT, the shift register GOA S outputs two sequential shifted output signals Gout5 and Gout6 at the two output signal ends under the control of the output clock signal lines CLK1 and CLK2, respectively, and outputs a cascade signal at the cascade output end OUT_C under the control of the control clock signal on the control clock signal line CLKC3. In this manner, the gate driver circuit outputs sequential shifted output signals.

Figure 21B:
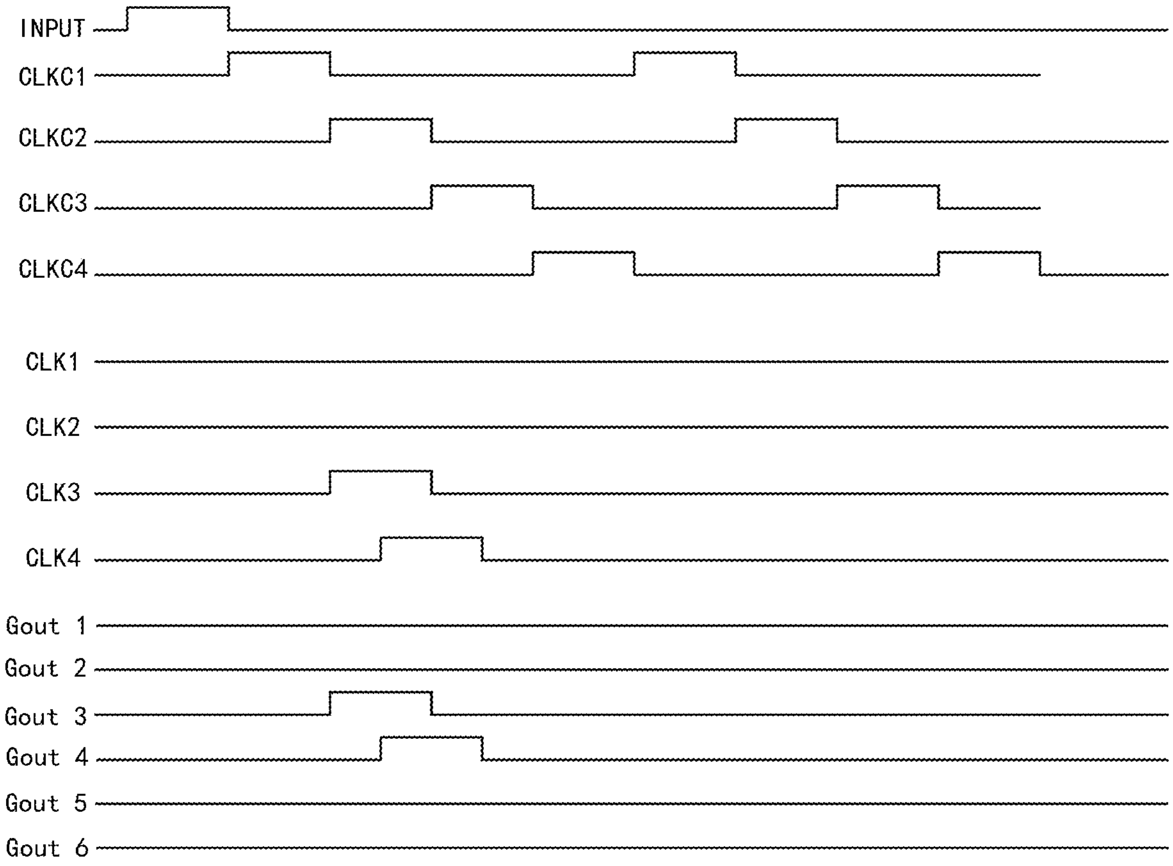
FIG. 21B is a signal timing diagram of a gate driver circuit in a local scanning mode according to at least one embodiment of the present disclosure.

FIG. 21B is a signal timing diagram of a gate driver circuit in a local scanning mode according to at least one embodiment of the present disclosure. As shown in FIG. 21B, the local scanning mode is, for example, a mode in which a gate scanning unit outputs gate scanning signals to all of a part of gate scanning signal lines connected thereto, and in the example shown in FIG. 21B, Gout 3 and Gout 4 output gate scanning signals to turn on gate lines in the 3rd row and the 4th row, while Gout 1, Gout 2, Gout 5, and Gout 6 do not output gate scanning signals. In the local scanning mode, the waveforms of CLKC1 to CLKC4 remain half of the waveforms corresponding to CLK1 and CLK3 in the global mode, and the CLK waveforms are generated on demand. The active level duty cycle of CLKC (including CLKC1 to CLKC4) and CLK (including CLK1 to CLK4) is less than or equal to ½.

Referring to FIG. 20 and FIG. 21B, an output clock signal is applied to some (e.g., CLK3 and CLK4) of the output clock signal lines CLK1 to CLK4 in the partial scanning mode such that both two output ends of the shift registers (e.g., GOA S−1 and GOA S+1) of the multi-stage shift registers of the gate driver circuit that are connected to CLK3 and CLK4 generate output signals, and neither of two output ends of the shift registers (GOA S−2 and GOA S) that are connected to CLK1 and CLK2 generates output signals.

For example, on and off of the output clock signal lines may be adjusted according to requirements. In other examples, for example, the output clock signal lines CLK1 and CLK3 in odd-numbered rows may be turned on, and the output clock signal lines CLK2 and CLK4 in even-numbered rows may be turned off. Accordingly, one output signal end of the shift register in each stage generates an output signal while the other output signal end does not generate an output signal. By turning off one or more output signals, the gate electrode of one or more sub-pixel rows is kept off, and accordingly writing of the data signal is avoided. It is to be noted that, for the local scanning mode, the cascade output end can always output the cascade signal, and the clock signals output from the clock signal lines can be output to a region that needs to be turned on, and thus, the effect of reducing the power consumption of the display panel can be realized.

Figure 22:
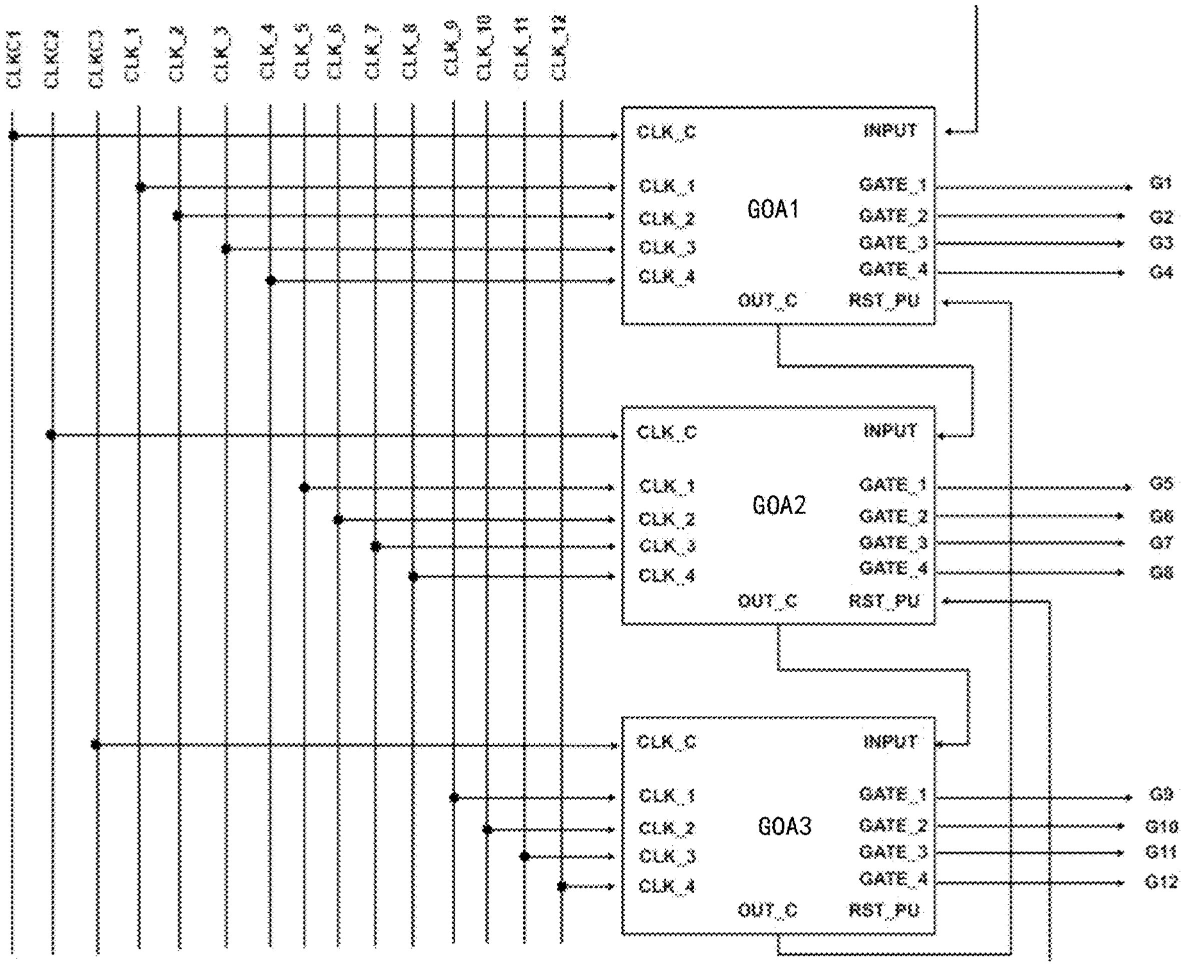
FIG. 22 is a schematic structural diagram of another gate driver circuit according to at least one embodiment of the present disclosure.

FIG. 22 is a schematic structural diagram of another gate driver circuit according to at least one embodiment of the present disclosure.

Referring to FIG. 22, in some embodiments, each shift register may include four output signal ends. For ease of description, three shift registers are illustrated in FIG. 22, with GOAL, GOA2, and GOA3 as examples. As shown in FIG. 22, an input signal end INPUT of a shift register in each stage is connected to a cascade output end OUT_C of the shift register in a higher stage. It is to be noted that INPUT herein may be connected to the OUT_C of the shift register in the upper stage or other upper stage, which is to be determined according to the cascade relationship, and is not limited herein. The three stages of shift registers GOAL, GOA2 and GOA3 are connected to 12 clock signal lines.

Referring to FIG. 22, each shift register in the gate driver circuit has four output circuits. The multi-stage cascaded shift registers may be divided into multiple groups, each group including, for example, a first shift register, a second shift register, and a third shift register in a 3-stage cascade. For example, in FIG. 22, a first group includes the shift registers GOA1, GOA2, and GOA3 in stage 1, stage 2 and stage 3 as a first shift register, a second shift register, and a third shift register of the first group, respectively.

Taking the first group as an example, four output clock signal ends CLK_1 to CLK_4 of the first shift register GOAL in the group are connected in one-to-one correspondence with a first clock signal line CLK1 to a fourth clock signal line CLK4, and four output clock signal ends CLK_1 to CLK_4 of the second shift register GOA2 are connected in one-to-one correspondence with a fifth clock signal line CLK5 to an eighth clock signal line CLK8, and four output clock signal ends CLK_1 to CLK_4 of the third shift register GOA3 are connected in one-to-one correspondence with a ninth clock signal line CLK9 to a twelfth clock signal line CLK12.

In FIG. 22, an input signal end INPUT of the first stage shift register GOAL is connected to a start signal line STV to receive a start signal. In operation, the first stage shift register GOA1 outputs four output signals G1 to G4 at each of the four output signal ends OUT_1 to OUT_4 on the basis of signals on the start signal line STV under the control of clock signals on the clock signal lines CLK1 to CLK4, and outputs a cascade signal at a cascade output end OUT_C to an input signal end INPUT of the second stage shift register GOA2. The second stage shift register GOA2 outputs four output signals G5 to G8 at each of the four output signal ends OUT_1 to OUT_4 on the basis of the cascade signal at the input signal end INPUT under the control of the clock signal lines CLK5 to CLK8, and so on.

For example, according to an embodiment of the present disclosure, in order to realize on and off of special rows in the various reload screens described above, the GOA supports output of corresponding CLK signals to gate electrodes of the pixel region according to needs. For example, by adopting a design in which 4 rows of CLK output control units share a set of cascade control module and noise reduction module, it is feasible that four gate signal output modules within a set of 4 rows of GOA units can independently control the order of output. In the cascade structure of GOA using 12 CLK architecture, the CLKC1 to CLKC3 signals are of the same signal waveforms as CLK1, CLK5, and CLK9, respectively, and used for outputting OUTC of each set of GOA units to control the cascade; the gate output module outputs the corresponding CLK signals when the PU is of a high level, and according to a CLK generation solution in the previous solution, this GOA solution can achieve the output of the corresponding CLK signals to the gate electrodes of the pixel region, so as to realize the desired on/off states of the gate electrodes, thus making the display panel correctly display a desired screen.

Figure 23:
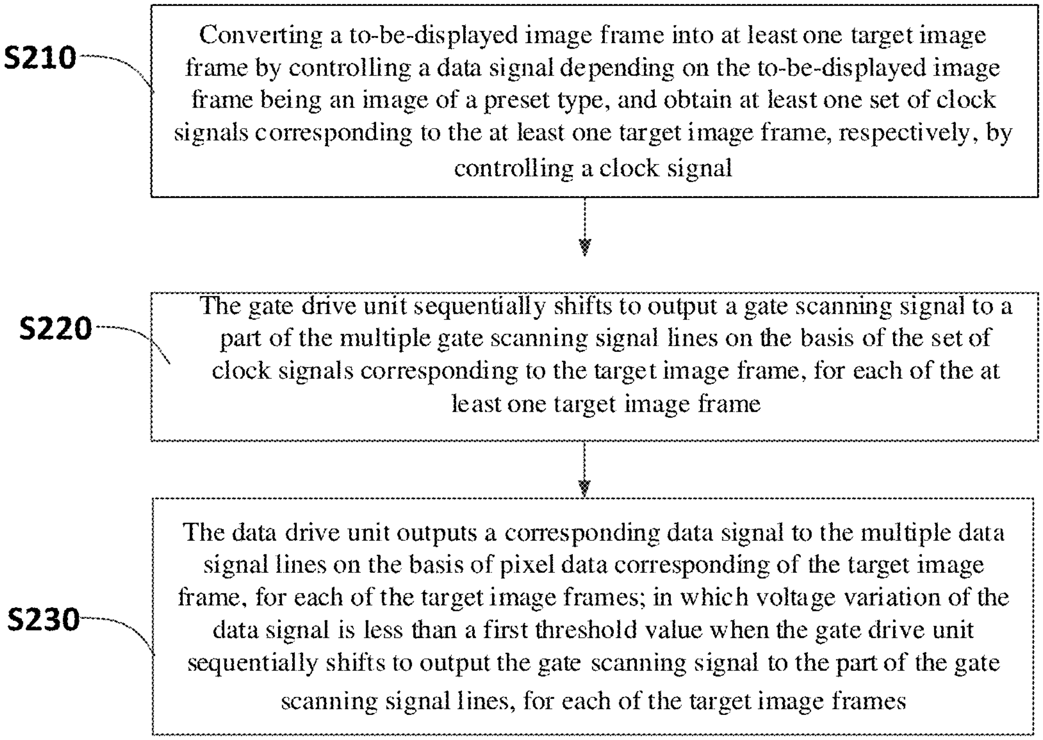
FIG. 23 is a flowchart of a drive method according to at least one embodiment of the present disclosure.

At least one embodiment of the present disclosure further provides a drive method for the display apparatus of any one of the foregoing embodiments. FIG. 23 is a flowchart of a drive method according to at least one embodiment of the present disclosure. For example, as shown in FIG. 23, the drive method includes steps S210 to S230 as below.

Step S210: Converting a to-be-displayed image frame into at least one target image frame by controlling a data signal depending on the to-be-displayed image frame being an image of a preset type, and obtain at least one set of clock signals corresponding to the at least one target image frame, respectively, by controlling a clock signal.

Step S220: The gate drive unit sequentially shifts to output a gate scanning signal to a part of the multiple gate scanning signal lines on the basis of the set of clock signals corresponding to the target image frame, for each of the at least one target image frame.

Step S230: The data drive unit outputs a corresponding data signal to the multiple data signal lines on the basis of pixel data corresponding of the target image frame, for each of the target image frames; in which voltage variation of the data signal is less than a first threshold value when the gate drive unit sequentially shifts to output the gate scanning signal to the part of the gate scanning signal lines, for each of the target image frames.

For example, steps S210 to S230 may be referred to, for example, FIG. 1 to FIG. 22 and the above descriptions of the corresponding figures, which will not be repeated herein.

The technical effects of the drive method of the embodiments of the present disclosure may be referred to the corresponding descriptions of the controller, the data drive unit, and the gate drive unit in the foregoing embodiments, and will not be repeated herein.

Figure 24:
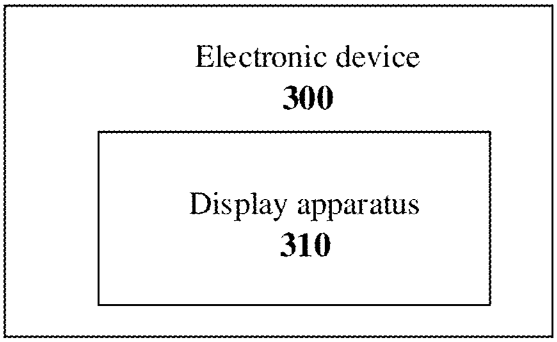
FIG. 24 is a schematic diagram of an electronic device according to at least one embodiment of the present disclosure.

At least one embodiment of the present disclosure further provides an electronic device. FIG. 24 is a schematic diagram of an electronic device according to at least one embodiment of the present disclosure. For example, as shown in FIG. 24, the electronic device 300 includes a display apparatus 310. The display apparatus 310 is, for example, a display apparatus according to any one of the embodiments of the present disclosure.

For example, the electronic device 300 may be any device such as a cell phone, a tablet computer, a laptop computer, an e-book, a game console, a television, a digital photo frame, and a navigator, or any combination of electronic devices and hardware. The embodiments of the present disclosure are not limited thereto.

It is to be noted that, for clarity and simplicity in description, the embodiments of the present disclosure do not give all the components of the electronic device 300. In order to implement the necessary functions of the electronic device 300, a person skilled in the art may provide and set up other components not shown according to specific needs. The embodiments of the present disclosure are not limited thereto.

Related descriptions and technical effects of the electronic device 300 may be referred to the related descriptions and technical effects of the display apparatus of the embodiments of the present disclosure, which will not be repeated herein.

The following statements should be noted:

(1) The drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

The invention claimed is:

1. A display apparatus, comprising:

a display substrate, comprising multiple rows of sub-pixels and multiple columns of sub-pixels arranged in an array, multiple gate scanning signal lines respectively connected to the multiple rows of sub-pixels, and multiple data signal lines respectively connected to the multiple columns of sub-pixels;

a control unit, configured to trigger an image conversion operation and a clock conversion operation depending on a to-be-displayed image frame being an image of a preset type, wherein the image conversion operation is used for converting the to-be-displayed image frame into at least one target image frame corresponding to the preset type by controlling a data signal, and the clock conversion operation is used for converting multiple initial clock signals into at least one set of clock signals corresponding to the at least one target image frame by controlling a clock signal;

a gate drive unit, configured to sequentially shift to output gate scanning signals to a part of the multiple gate scanning signal lines on the basis of the set of clock signals corresponding to the target image frame, for each of the at least one target image frame; and a data drive unit, configured to output corresponding data signals to the multiple data signal lines on the basis of pixel data of the target image frame, for each of the target image frames;

wherein voltage variation of the data signals is less than a first threshold value when the gate drive unit sequentially shifts to output the gate scanning signals to the part of the gate scanning signal lines, for each of the target image frames;

each row of the multiple rows of sub-pixels and the multiple columns of sub-pixels comprises multiple sub-pixels, the multiple sub-pixels comprise a first type of sub-pixels, a second type of sub-pixels and a third type of sub-pixels arranged circularly;

the multiple sub-pixels in each row are connected to two of the multiple gate scanning signal lines, and the two gate scanning signal lines are connected to an odd-numbered column of sub-pixels and an even-numbered column of sub-pixels of the multiple sub-pixels, respectively; and each of the multiple data signal lines connects two columns of sub-pixels of the same type;

the gate drive unit comprises multiple cascaded shift registers, and each of the shift registers comprises: a cascade circuit connected to a control clock signal end of the shift register, and K output circuits, connected to K output clock signal ends of the shift register, where K is an integer greater than 1.

2. The display apparatus according to claim 1, wherein voltage of the data signals is maintained constant when the gate drive unit sequentially shifts to output the gate scanning signals to the part of the gate scanning signal lines, for each of the target image frames.

3. The display apparatus according to claim 1, wherein each of the at least one set of clock signals is some of the multiple initial clock signals; and the at least one target image frame is consecutive image frames.

4. The display apparatus according to claim 1, wherein the multiple rows of sub-pixels and the multiple columns of sub-pixels comprise various types of sub-pixels, and the various types of sub-pixels output light in multiple colors; and in each of the target image frames, a difference value in grayscales corresponding to the same type of sub-pixels is not greater than a second threshold.

5. The display apparatus according to claim 1, wherein the two gate scanning signal lines comprise a first gate scanning signal line connected to one of an even-numbered column of sub-pixels and an odd-numbered column of sub-pixels in the corresponding row and a second gate scanning signal line connected to the other of them.

6. The display apparatus according to claim 5, wherein the preset type comprises a first type, wherein pixel data of an ith row of pixels and pixel data of an (i+1)th row of pixels of an image of the first type correspond to a first grayscale range and a second grayscale range, respectively, and the first grayscale range being larger than the second grayscale range, where i is a positive integer.

7. The display apparatus according to claim 6, wherein in a case where the to-be-displayed image frame is the first type, the at least one target image frame comprises a first image frame, and the pixel data of the ith row of pixels and the pixel data of the (i+1)th row of pixels of the first image frame both correspond to the first grayscale range;

in a case that the target image frame is the first image frame, the part of the gate scanning signal lines comprise the gate scanning signal line connected to sub-pixels of the ith row of pixels.

8. The display apparatus according to claim 5, wherein the preset type comprises a second type, pixel data of an odd-numbered column of pixels and pixel data of an even-numbered column of pixels of an image of the second type correspond to a third grayscale range and a fourth grayscale range, respectively, and the third grayscale range is different from the fourth grayscale range.

9. The display apparatus according to claim 8, wherein in a case that the to-be-displayed image frame is the second type, the at least one target image frame comprises a second image frame and a third image frame that are consecutive;

wherein pixel data of the first type of sub-pixels and pixel data of the third type of sub-pixels in the second image frame correspond to a larger one of the third grayscale range and the fourth grayscale range, and pixel data of the second type of sub-pixels in the second image frame corresponds to the one with a smaller brightness of the third grayscale range and the fourth grayscale range; and pixel data of the second type of sub-pixels in the third image frame corresponds to the one with a greater brightness of the third grayscale range and the fourth grayscale range, and pixel data of the first type of sub-pixels and pixel data of the third type of sub-pixels in the third image frame correspond the one with the smaller brightness of the third grayscale range and the fourth grayscale range.

10. The display apparatus according to claim 9, wherein in a case where the target image frame is the second image frame, the part of the gate scanning signal lines comprise a first part of gate scanning signal lines; and in a case where the target image frame is the third image frame, the part of the gate scanning signal lines comprise a second part of gate scanning signal lines;

wherein the first part of gate scanning signal lines comprise multiple first gate scanning signal lines respectively connected to the multiple rows of sub-pixels, and the second part of gate scanning signal lines comprise multiple second gate scanning signal lines respectively connected to the multiple rows of sub-pixels.

11. The display apparatus according to claim 5, wherein the preset type comprises a third type, pixel data of a first part of pixels and pixel data of a second part of pixels of an image of the third type correspond to a fifth grayscale range and a sixth grayscale range, respectively, the first part of pixels and the second part of pixels are alternately arranged in a row direction as well as in a column direction, and the fifth grayscale range is different from the sixth grayscale range.

12. The display apparatus according to claim 11, wherein in a case where the to-be-displayed image frame is the third type, the at least one target image frame comprises a fourth image frame and a fifth image frame that are consecutive;

wherein pixel data of the first type of sub-pixels and pixel data of the third type of sub-pixels in the fourth image frame correspond to the one with a greater brightness of the fifth grayscale range and the sixth grayscale range, pixel data of the second type of sub-pixels in the fourth image frame corresponds to the one with a smaller brightness of the fifth grayscale range and the sixth grayscale range; and pixel data of the second type of sub-pixels in the fifth image frame corresponds to the one with a greater brightness of the fifth grayscale range and the sixth grayscale range, and pixel data of the first type of sub-pixels and pixel data of the third type of sub-pixels in the fifth image frame correspond to the one with a smaller brightness of the fifth grayscale range and the sixth grayscale range.

13. The display apparatus according to claim 12, wherein in a case that the target image frame is the fourth image frame, the part of gate scanning signal lines comprise a third part of gate scanning signal lines; and in a case that the target image frame is the fifth image frame, the part of gate scanning signal lines comprise a fourth part of gate scanning signal lines;

wherein the third part of gate scanning signal lines comprise multiple first gate scanning signal lines connected to multiple odd-numbered rows of sub-pixels and multiple second gate scanning signal lines connected to multiple even-numbered rows of sub-pixels, respectively, and the fourth part of gate scanning signal lines comprise multiple first gate scanning signal lines connected to multiple even-numbered rows of sub-pixels and multiple second gate scanning signal lines connected to multiple odd-numbered rows of sub-pixels, respectively.

14. The display apparatus according to claim 1, wherein the control unit comprises a timing controller and a level shifter;

wherein the timing controller is configured to receive the pixel data of the to-be-displayed image frame, and to generate the multiple initial clock signals on the basis of the pixel data of the to-be-displayed image frame, depending on the to-be-displayed image frame being an image of the preset type; and the level shifter is configured to receive the initial clock signals from the timing controller, and perform, in response to receiving the initial clock signals, the clock conversion operation.

15. The display apparatus according to claim 14, wherein the timing controller is configured to sequentially transfer the pixel data corresponding to the at least one target image frame to the data drive unit depending on the to-be-displayed image frame being an image of a preset type; or the timing controller is configured to send an image conversion execution instruction to the data drive unit to trigger the data drive unit to transmit a corresponding data signal to perform the image conversion operation depending on the to-be-displayed image frame being an image of a preset type.

16. The display apparatus according to claim 1, wherein each of the shift registers further comprises:

a first circuit connected to an input signal end, a first node and a second node of the shift register, the first circuit being configured to provide a signal from the input signal end to the first node and to pull down a potential of the first node under the control of a potential of the second node;

a control circuit connected to the first node and the second node, the control circuit being configured to control the potential of the second node according to the potential of the first node;

wherein the cascade circuit is further connected to the first node, the second node, and a cascade output end of the shift register, the cascade circuit being configured to provide a signal from the control clock signal end to the cascade output end under the control of the potential of the first node, and to pull down a potential of the cascade output end under the control of the potential of the second node;

the K output circuits are further connected to the input signal end, the second node, K sub-nodes, and K output signal ends of the shift register, respectively, wherein a kth output circuit is connected to the input signal end, the second node, a kth output signal end, and a kth sub-node, and is configured to input a signal from the input signal end to the kth sub-node, provide a signal from the kth output clock signal end to the kth output signal end under the control of a potential of the kth sub-node, and pull down a potential of the kth output signal end under the control of the potential of the second node, where k is an integer, and 1≤k≤K.

17. The display apparatus according to claim 16, wherein the kth output circuit comprises:

an input sub-circuit connected to the input signal end and the kth sub-node and configured to provide a signal from the input signal end to the kth sub-node;

an output sub-circuit connected to the kth sub-node, the kth output clock signal end, and the kth output signal end and configured to provide a signal from the kth output clock signal end to the kth output signal end under the control of the potential of the kth sub-node; and a second sub-circuit connected to the second node and configured to pull down the potential of the kth sub-node and the kth output signal end under the control of the potential of the second node.

18. A drive method for the display apparatus according to claim 1, comprising:

converting a to-be-displayed image frame into at least one target image frame by controlling a data signal depending on the to-be-displayed image frame being an image of a preset type, and obtaining at least one set of clock signals corresponding to the at least one target image frame, respectively, by controlling a clock signal;

by the gate drive unit, sequentially shifting to output gate scanning signals to a part of the multiple gate scanning signal lines on the basis of the set of clock signals corresponding to the target image frame, for each of the at least one target image frame; and by the data drive unit, outputting corresponding data signals to the multiple data signal lines on the basis of pixel data corresponding of the target image frame, for each of the target image frames;

wherein voltage variation of the data signals is less than a first threshold value when the gate drive unit sequentially shifts to output the gate scanning signals to the part of the gate scanning signal lines, for each of the target image frames.

19. An electronic device, comprising the display apparatus according to claim 1.

* * * * *